(12) United States Patent
Shimizu et al.

(10) Patent No.: US 10,763,616 B2
(45) Date of Patent: Sep. 1, 2020

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroshi Shimizu, Mie (JP); Ryouya Okamoto, Mie (JP); Hitoshi Takeda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/347,241

(22) PCT Filed: Nov. 9, 2017

(86) PCT No.: PCT/JP2017/040354
§ 371 (c)(1),
(2) Date: May 3, 2019

(87) PCT Pub. No.: WO2018/096931
PCT Pub. Date: May 31, 2018

(65) Prior Publication Data
US 2019/0288447 A1 Sep. 19, 2019

(30) Foreign Application Priority Data
Nov. 22, 2016 (JP) .................................. 2016-226995

(51) Int. Cl.
*H01R 13/62* (2006.01)
*H01R 13/629* (2006.01)
(Continued)

(52) U.S. Cl.
CPC .......... *H01R 13/629* (2013.01); *H01G 4/228* (2013.01); *H01G 11/10* (2013.01); *H01M 2/10* (2013.01);
(Continued)

(58) Field of Classification Search
CPC ....... H01R 13/629; H01G 4/228; H01G 11/10
(Continued)

(56) References Cited

U.S. PATENT DOCUMENTS 9,281,613 B2 * 3/2016 Kinoshita .............. H01R 13/60
9,543,711 B2 * 1/2017 Nakayama ............. G01K 13/00
(Continued)

FOREIGN PATENT DOCUMENTS

JP 2011-108461 6/2011
JP 2013-016367 1/2013
(Continued)

OTHER PUBLICATIONS

Official Communication issued in International Bureau of WIPO Patent Application No. PCT/JP2017/040354, dated Dec. 12, 2017.

*Primary Examiner* — Alexander Gilman
(74) *Attorney, Agent, or Firm* — Greenblum & Bernstein, P.L.C.

(57) ABSTRACT

A wiring module is for attachment to a power module in which power elements that store or generate electrical power are arranged side-by-side. The wiring module includes: an insulating protector that houses interconnection conductors for interconnecting the power elements; detection wires that are housed in the insulating protector, extend from a side corresponding to the power elements, and detect a state of
(Continued)

the power elements; a connector that is provided at an end portion of the detection wires and is arranged inside the insulating protector; and a movement restricting means that is provided in the insulating protector and is for restricting movement of the connector by locking the connector.

7 Claims, 19 Drawing Sheets

(51) Int. Cl.

| | |
|---|---|
| *H01G 4/228* | (2006.01) |
| *H01M 2/10* | (2006.01) |
| *H01M 2/20* | (2006.01) |
| *H01R 13/44* | (2006.01) |
| *H01R 13/502* | (2006.01) |
| *H01R 13/639* | (2006.01) |
| *H01R 13/73* | (2006.01) |
| *H01G 11/10* | (2013.01) |
| *H01R 13/46* | (2006.01) |

(52) U.S. Cl.
CPC .......... *H01M 2/1077* (2013.01); *H01M 2/20* (2013.01); *H01M 2/206* (2013.01); *H01R 13/44* (2013.01); *H01R 13/46* (2013.01); *H01R 13/502* (2013.01); *H01R 13/639* (2013.01); *H01R 13/73* (2013.01); *H01M 2220/20* (2013.01)

(58) Field of Classification Search
USPC ........................................................ 439/345
See application file for complete search history.

(56) References Cited

U.S. PATENT DOCUMENTS

| | | | |
|---|---|---|---|
| 10,330,536 B2* | 6/2019 | Okamoto | ................ G01K 1/14 |
| 10,333,236 B2* | 6/2019 | Okamoto | ............... H01R 13/58 |
| 10,431,924 B2* | 10/2019 | Takahashi | .......... H01R 13/5227 |
| 2004/0043663 A1* | 3/2004 | Ikeda | .................... H01M 2/206 |
| | | | 439/627 |
| 2013/0008713 A1* | 1/2013 | Fujioka | .............. H01R 13/6273 |
| | | | 174/72 A |
| 2014/0315441 A1* | 10/2014 | Kinoshita | ........... H01M 2/1077 |
| | | | 439/627 |

FOREIGN PATENT DOCUMENTS

| | | |
|---|---|---|
| JP | 2013-152918 | 8/2013 |
| JP | 2014-060044 | 4/2014 |
| JP | 2016-009646 | 1/2016 |

\* cited by examiner

WIRING MODULE

TECHNICAL FIELD

The present invention relates to a wiring module.

BACKGROUND ART

Patent Document 1 discloses a known example of a wiring module for arrangement on a storage battery.

Such a wiring module generally includes detection wires for detecting the statuses of electric cells included in the storage battery, and a connector is provided at the leading ends of the detection wires to enable connection to a connector (hereinafter, called a "partner connector") that is provided in a partner device such as an ECU (Electronic Control Unit). Because this connector is a power supply connector, it is common knowledge to employ a female connector in order to prevent contact with a hand.

In the case of the wiring module in Patent Document 1, the detection wires extend from the respective electric cells, pass through the wiring module main body, are routed to one end edge portion of the wiring module, furthermore drawn to the outside and bundled, and then provided with a female connector (so-called pigtail).

With such a pigtail, even if the female connector is pulled or pushed by external force when mated with the partner connector, the external force can be cancelled by changes in the extent of flexure. In other words, it is possible to "cut off" external force outside the wiring module main body.

However, depending on the arrangement relationship between the storage battery and the external device for example, there are cases where it is not possible to ensure sufficient external space for employing such a pigtail type of connector, and therefore sometimes it is necessary to provide a female connector at the leading ends of the detection wires at one end portion of the wiring module main body. In this case, because a pigtail is not employed, external force acting on the female connector during mating with the male connector (partner connector) or the like is not cancelled outside of the wiring module main body, thus resulting in movement of the connector, which has the risk of being transmitted to the detection wires inside the wiring module and reaching the connections at the electric cells.

CITATION LIST

Patent Document

Patent Document 1: JP 2016-9646A ([0036], FIG. 1)

SUMMARY OF INVENTION

Technical Problem

The present invention was achieved in light of the foregoing circumstances, and an object of the present invention is to provide a wiring module that is space-efficient while also suppressing the case where external force is transmitted from a connector to a detection wire.

Solution to Problem

A wiring module according to technology disclosed in the present specification is a wiring module for attachment to a power module in which a plurality of power elements that store or generate electrical power are arranged side-by-side, the wiring module including: an insulating protector that houses a plurality of interconnection conductors for interconnecting the power elements; a plurality of detection wires that are housed in the insulating protector, extend from a side corresponding to the power elements, and detect a state of the power elements; a connector that is provided at an end portion of the detection wires and is arranged inside the insulating protector; and a movement restricting means that is provided in the insulating protector and restricts movement of the connector by locking the connector.

According to this configuration, movement of the connector can be restricted by the insulating protector, and therefore even if external force is applied to the connector, such external force can be prevented from influencing the detection wires.

Configurations described below are preferable as embodiments of the wiring module disclosed in the present specification.

The connector is a female connector that includes a housing having a forward portion that is to be fitted into a hood portion provided in a partner connector, and the insulating protector is provided with a support base portion that, by supporting a rearward portion of the housing that is not to be fitted into the hood portion, holds the fitting-target forward portion in a state of floating above the insulating protector.

A rear stopping portion is integrated with the support base portion as the movement restricting means, the rear stopping portion restricting rearward movement of the housing by locking a region of a back surface portion of the female connector that is outside a region in which the detection wires are introduced.

A portion of the female connector is held in the insulating protector in a floating state by the support base portion, and the rear stopping portion restricts movement of the female connector toward the back surface, and therefore the partner connector can be mated in a state where the female connector is attached to the insulating protector. Even if force attempting to move the female connector toward the back surface is applied during mating, that force is absorbed by the movement restricting means, thus eliminating the risk of external force being applied to the detection wires. Moreover, the region of the connector that guides the detection wires is surrounded in contact, thus making it possible to evenly restrict movement of the back surface of the connector.

A pair of lateral stopping portions are integrated with the support base portion as the movement restricting means, the pair of lateral stopping portions restricting lateral movement of the female connector by coming into contact with a side wall of the housing of the female connector.

An upper stopping portion is integrated with each of the pair of lateral stopping portions of the support base portion as the movement restricting means, the upper stopping portions restricting upward movement of the female connector by coming into contact with a top plate of the housing of the female connector.

A cantilevered elastic piece having a free end on a rear side of the female connector is provided as the movement restricting means, the elastic piece being provided in correspondence with a portion of the insulating protector in which the housing of the female connector is in the floating state, and in a state where the female connector is not mated with the partner connector, the elastic piece restricts forward movement of the female connector by locking of the free end to the housing of the female connector, and when the partner connector is mated with the female connector, the elastic piece is pressed by the hood portion of the partner connector so as to become elastically displaced to a position outside of a mating path of the hood portion.

According to this configuration, the elastic piece comes into contact with the front face of the connector and restricts forward displacement thereof when the partner connector has not been mated, but when the connector is mated to the partner connector, the elastic pieces becomes displaced to a location outside the mating path of the partner connector so as to avoid interference with the partner connector. Accordingly, it is possible to restrict forward (direction of mating with the partner connector) movement of the connector when the connector is not mated to the partner connector.

The insulating protector is provided with a cover portion that covers the female connector and the partner connector in a state where the two connectors are mated, and the housing of the female connector is provided with a rib portion that projects from a portion that is not to be fitted into the hood portion, and a front stopping portion is provided in the cover portion as the movement restricting means, the front stopping portion being capable of coming into contact with a front face of the rib portion in a state of covering the two connectors when mated.

According to the above-described configuration, after opening the cover and removing the front stopping portion so as to open the region in front of the movement restricting portion, by then arranging the connector in the insulating protector from the forward side, and placing the cover over the connector, it is possible to restrict forward movement of the connector. Accordingly, movement of the female connector can be reliably restricted in all directions.

Advantageous Effects of Invention

With the wiring module according to technology disclosed in the present specification, it is possible to achieve space efficiency while also protecting a detection wire from external force applied to a connector.

DESCRIPTION OF EMBODIMENTS

First Embodiment

Figure 1:
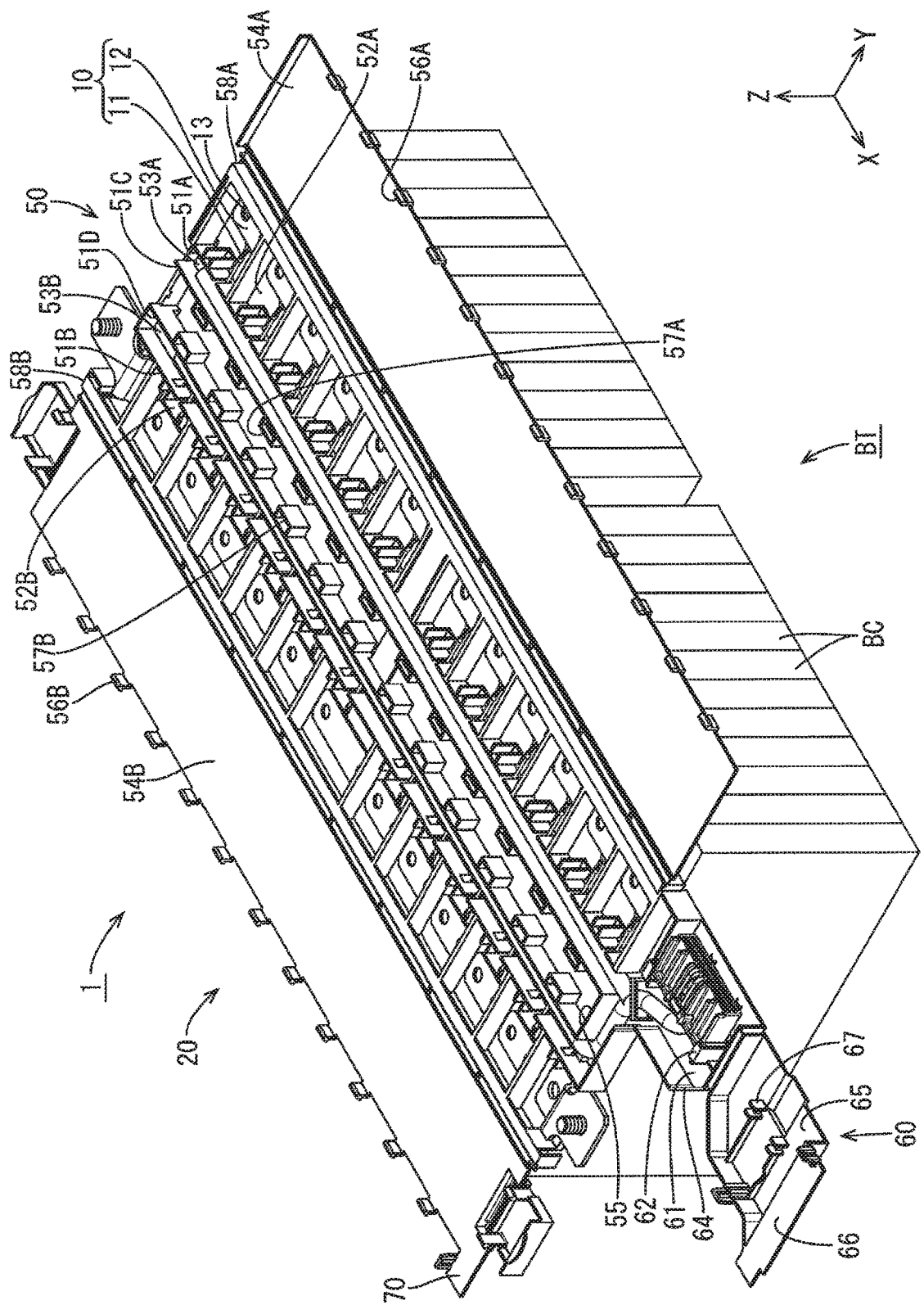
FIG. 1 is a perspective view of a wiring module of a first embodiment.

A first embodiment of technology disclosed in the present specification will be described below with reference to FIGS. 1 to 14.

A wiring module 1 (one example of a power module) of the present embodiment is for mounting to a power storage module BT in which a plurality of power storage elements BC, which may be lithium ion batteries or the like, are arranged side-by-side. The power storage module BT is for installation in a vehicle such as an electric automobile or a hybrid automobile, and is used as a power supply for traveling. Note that although the power storage elements BC are one example of power elements, the electrical power elements are not limited thereto, and may also be capacitors, fuel cells, or the like. In the following description, the X direction in the drawings is the rightward direction, the Y direction is the forward direction, and the Z direction is the upward direction. Also, in the following description, when there are more than one of the same member, there are cases where only one of such members is denoted by a reference sign, and reference signs have been omitted for the other members.

The power storage module BT includes a plurality of power storage elements BC that are arranged side-by-side in a single line in the left-right direction such that the positive and negative terminals thereof alternate, and the wiring module 1 is attached to the upper surface as shown in FIG. 1. The power storage elements BC each have a flattened rectangular parallelepiped-shaped main body portion in which a power storage element is housed, and include a bolt-shaped electrode terminal (not shown) that projects from a seating face provided on an upper portion of the main body portion. Note that the power storage elements BC are one example of power elements, and may also be a battery, a capacitor, or a fuel cell.

Figure 2:
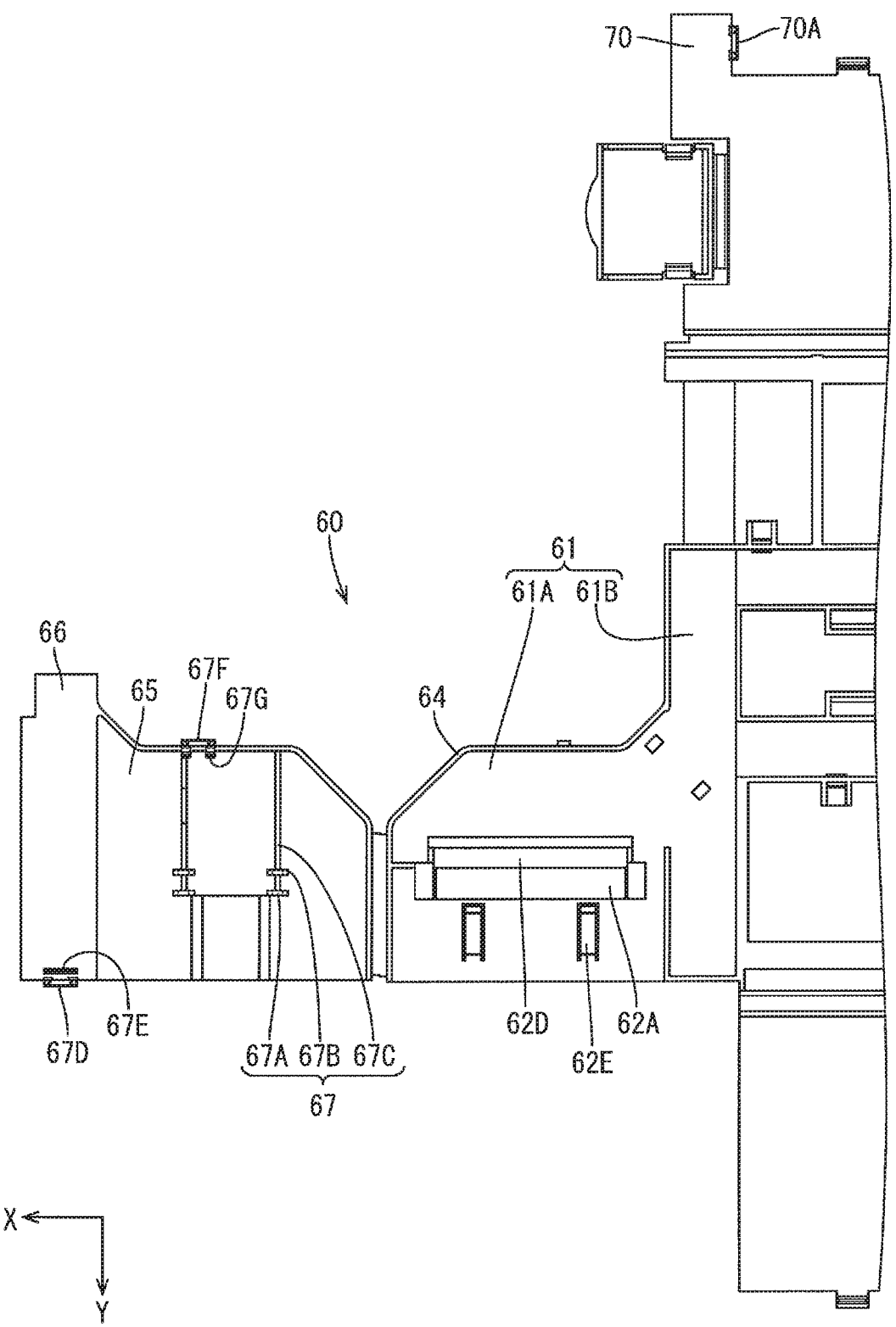
FIG. 2 is a top view of the wiring module.

As shown in FIGS. 1 and 2, the wiring module 1 is configured by a plurality of bus bar terminals 10 (one example of a circuit), a plurality of detection wires 90 that are respectively connected to the bus bar terminals 10, a female connector 30 (one example of a connector) that is connected to the ends of the detection wires 90, and an insulating protector 20 that houses the above-mentioned members and is placed on the upper surface of the power storage module BT.

The bus bar terminals 10 correspond to interconnection conductors that are formed from a conductive metal plate made of copper, a copper alloy, aluminum, an aluminum alloy, or the like, and each include a terminal connection portion 12 that is connected to an electrode terminal BP of a corresponding power storage element BC, and a wire connection portion 11 that is integrated with the terminal connection portion 12. Note that a bus bar is one example of an interconnection conductor, but the interconnection conductor is not limited to this, and may also be an electrical wire, an insulated electrical wire, or the like.

Each of the terminal connection portions 12 is shaped as a substantially rectangular plate, and is provided with a bolt through-hole 13 in each of two end portions in the lengthwise direction for connecting batteries to each other. The electrode terminals BP of the power storage elements BC can be passed through the bolt through-holes 13.

Each of the wire connection portions 11 is constituted by a pair of crimping pieces, and is connected to one end portion of a corresponding detection wire 90 by being fixed thereto through crimping. The other end portion of the detection wire 90 is connected to a terminal fitting (not shown) of a later-described partner connector M (male connector). The detection wire 90 is an insulated electrical wire including a conductor portion that is surrounded by an insulation covering (insulating layer). The detection wire 90 and the partner connector M are for connecting the bus bar terminal 10 to an external ECU (Electronic Control Unit) that is not shown. Note that the ECU is provided with a microcomputer, electronic components, and the like, and has a known configuration including functions for detecting the voltage, current, temperature, and the like of the power storage elements BC, controlling the charging and discharging of the power storage elements BC, and so on.

Figure 3:
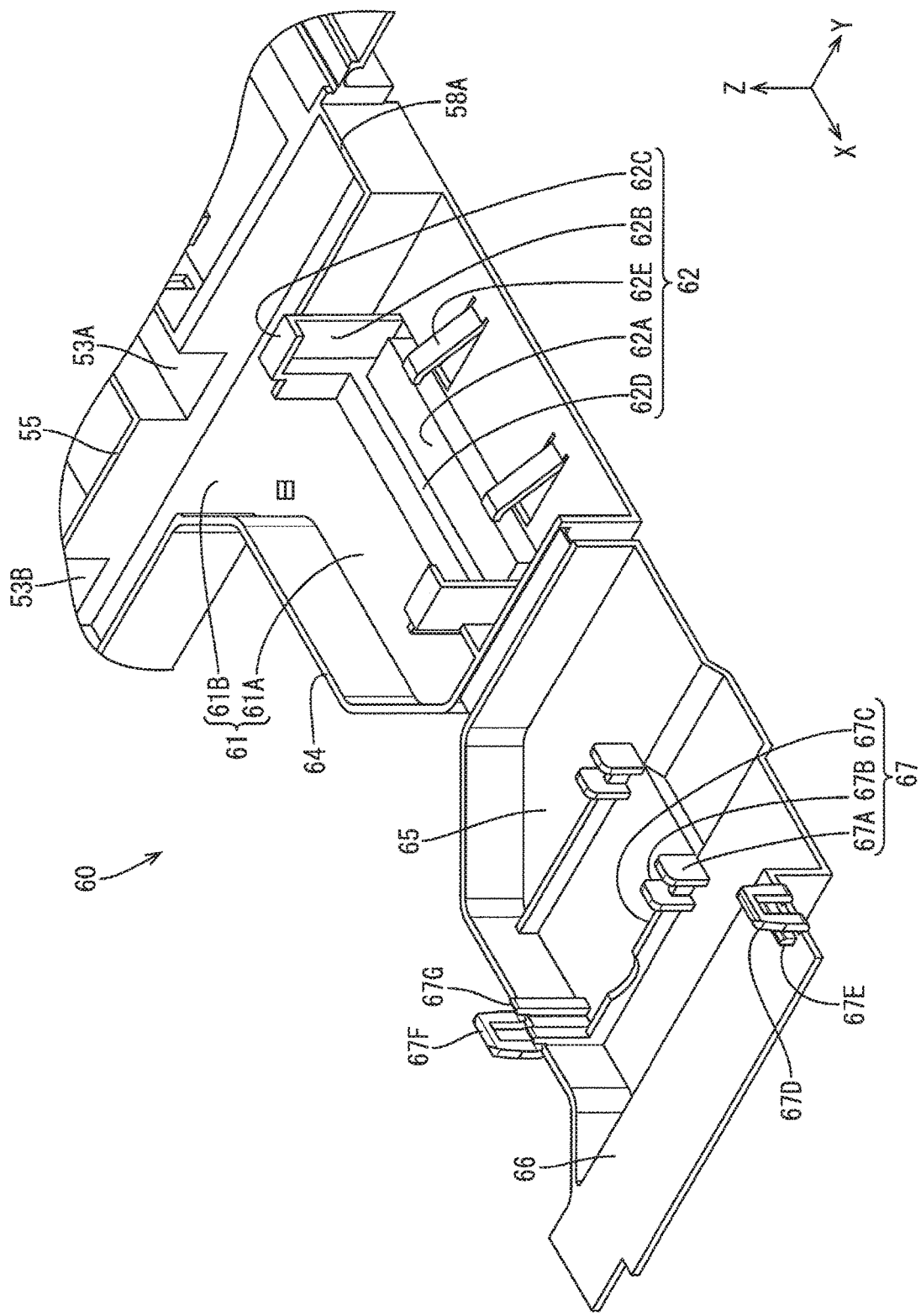
FIG. 3 is a perspective view of a connector housing portion.

The insulating protector 20 is made of an insulating synthetic resin, and as shown in FIGS. 1 to 3, includes a bus bar support portion 50 that supports the bus bar terminals 10, and a connector housing portion 60 that is integrated with the bus bar support portion 50 so as to be continuous therewith from the right end portion thereof.

The bus bar support portion 50 has a substantially rectangular plate surface and is provided with a front wall portion 58A and a rear wall portion 58B at the front and rear edge portions of the substantially rectangular plate surface, and first to fourth partition walls 51A to 51D are provided extending in the left-right direction between the front wall portion 58A and the rear wall portion 58B. The right end edge portions of the third partition wall 51C and the fourth partition wall 51D are joined to a partition joining portion 55 that is provided extending upward from the plate surface of the bus bar support portion 50.

One portion of the plate surface of the bus bar support portion 50 between the front wall portion 58A and the first partition wall 51A is a first bus bar mounting surface 52A, and another portion of the plate surface between the rear wall portion 58B and the second partition wall 51B is a second bus bar mounting surface 52B. The bus bar mounting surfaces 52A and 52B are divided by dividing walls into small sections that are side-by-side in the left-right direction, and two through-holes (not shown) are provided in each of the small sections. As shown in FIG. 1, the bus bar terminals 10 are mounted on the bus bar mounting surfaces 52A and 52B in the small sections in an orientation according to which two threaded holes are side-by-side in the left-right direction (arrangement direction of the power storage elements BC). Note that in each of the small sections, a cutout is provided in the upper edge portion of the first partition wall 51A or the second partition wall 51B.

Note that in order to alternatingly connect the positive and negative terminals of adjacent power storage elements BC on the power storage module BT, the second bus bar mounting surfaces 52B are shifted rightward from the first bus bar mounting surfaces 52A by half the left-right dimension of each of the small sections. As a result, a surplus surface 61B having a width equal to half the left-right width of the small section of the first bus bar mounting surface 52A is formed in front of each of the second bus bar mounting surfaces 52B and extends to the front wall surface of the connector housing portion 60.

One portion of the plate surface of the bus bar support portion 50 between the first partition wall 51A and the third partition wall 51C is a first wire mounting surface 53A, and another portion of the plate surface between the second partition wall 51B and the fourth partition wall 51D is a second wire mounting surface 53B.

The detection wires 90 connected to the bus bar terminals 10 extend over the bus bar mounting surfaces 52A and 52B, pass through the cutouts in the first partition wall 51A and the second partition wall 51B, are routed along the wire mounting surfaces 53A and 53B, and are then drawn out from the right end portions thereof. Note that the individual detection wires 90 are not shown in detail in the bus bar support portion 50 and the connector housing portion 60, but rather are shown schematically by one tube-shaped member in each routing location.

A flat plate-shaped first cover 54A and second cover 54B are respectively integrated with the upper edge portions of the front wall portion 58A and the rear wall portion 58B of the bus bar support portion 50 via hinges. The end edge portions of the first cover 54A and the second cover 54B on the side opposite to the hinges are respectively provided with locking claws 56A and 56B that are spaced apart at equal intervals. The surface of the third partition wall 51C that is on the side distant from the front wall portion 58A and the surface of the fourth partition wall 51D that is on the side distant from the rear wall portion 58B are respectively provided with lock receiving portions 57A and 57B that are spaced apart at equal intervals and correspond to the locking claws 56A and 56B. Accordingly, when the covers are closed by being pivoted at the hinges so as to cover the tops of the bus bar mounting surfaces 52A and 52B and the wire mounting surfaces 53A and 53B, the locking claws 56A and 56B of the covers become locked to the lock receiving portions 57A and 57B.

The connector housing portion 60 is provided on the right end side of the insulating protector 20 in the arrangement direction of the power storage elements BC, and as shown in FIGS. 2 and 3, includes a plate-shaped seat portion 61, a support base portion 62 (one example of a support base portion, and one example of a movement restricting means) provided on the seat portion 61, a side wall portion 64, a connector cover 65 (one example of a cover portion), a front wire cover 66, and a rear wire cover 70.

The seat portion 61 includes the above-mentioned surplus surface 61B that is a portion of the plate surface of the previously described bus bar support portion 50, and an extending surface 61A that extends rightward from the front half of the surplus surface 61B, and the seat portion 61 is a plate surface that is substantially shaped as a reversed "L". In other words, a portion of the seat portion 61 is provided using the surplus surface 61B, which is a portion of the plate surface of the bus bar support portion 50.

The support base portion 62 is provided at approximately the center, with respect to the front-rear direction, of the extending surface 61A of the seat portion 61. Specifically, the support base portion 62 is shifted rightward by half the width of the surplus surface 61B of the seat portion 61. The support base portion 62 includes a pair of plate-shaped lateral stopping portions 62B that rise perpendicularly upward from the extending surface 61A, a pair of plate-shaped upper stopping portions 62C that are integrated with the lateral stopping portions 62B and extend toward each other from upper ends of the lateral stopping portions 62B, a plate-shaped bearing portion 62A (one example of a support base portion) that extends in the left-right direction between two portions of the side wall portion 64 above the extending surface 61A, and a rear stopping portion 62D provided on a back surface 45 side of the aforementioned members, and the support base portion 62 is left-right symmetrical with respect to a center line in the left-right direction of the extending surface 61A.

The mutually opposing surfaces of the two lateral stopping portions 62B are flat surfaces that are parallel with each other. Also, the lower surface of the upper stopping portion 62C and the upper surface of the bearing portion 62A are flat surfaces that are parallel with the extending surface 61A. In a front view of the support base portion 62, the flat front face of the rear stopping portion 62D is exposed with an approximately sharp-cornered "U" shape that is open upward, at a deep portion in the space of the support base portion 62. Accordingly, the bearing portion 62A, the lateral stopping portions 62B, the upper stopping portions 62C, and the rear stopping portion 62D are integrated.

Figure 9:
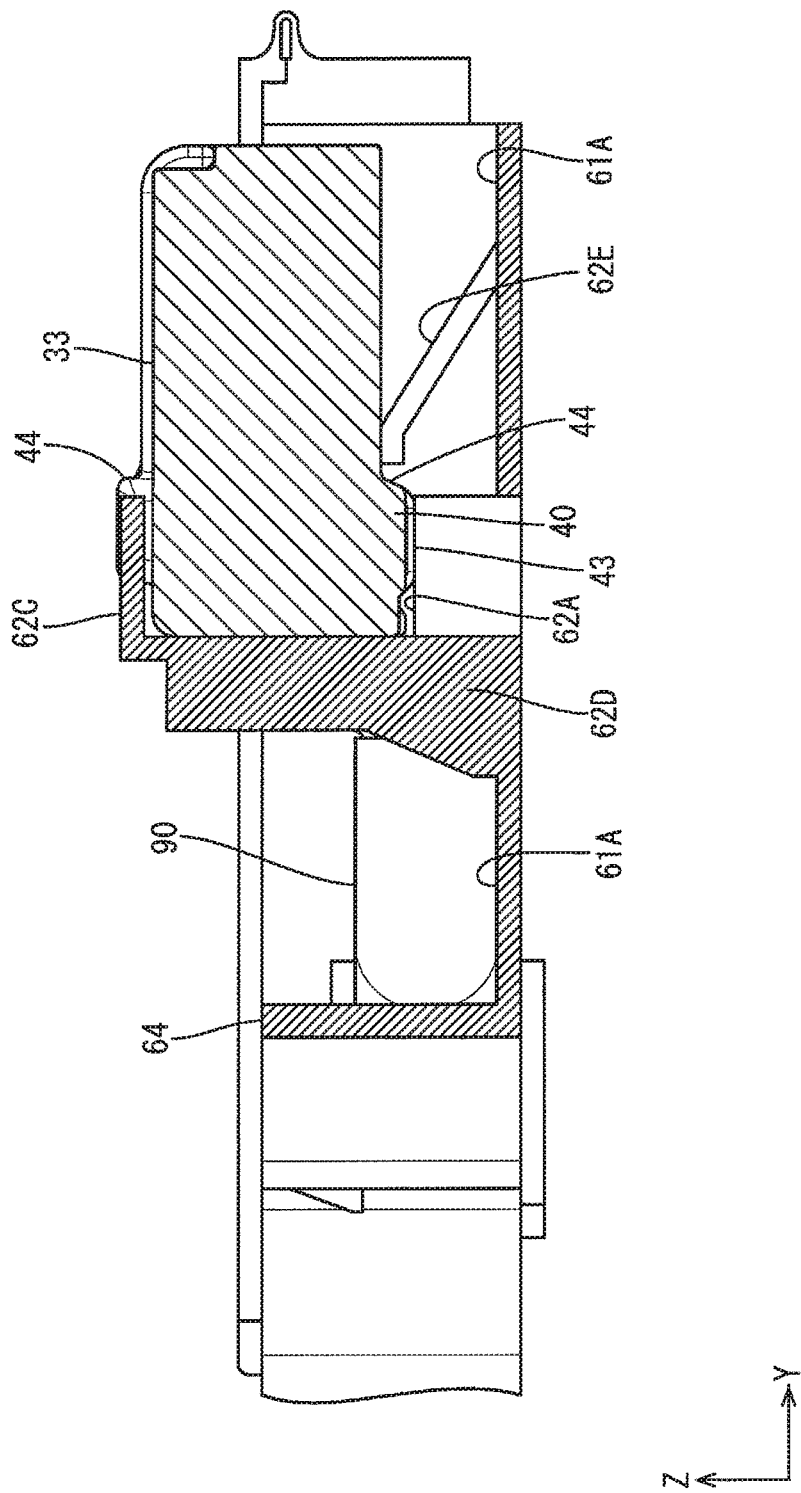
FIG. 9 is a cross-sectional view taken along A-A in FIG. 8.
Figure 10:
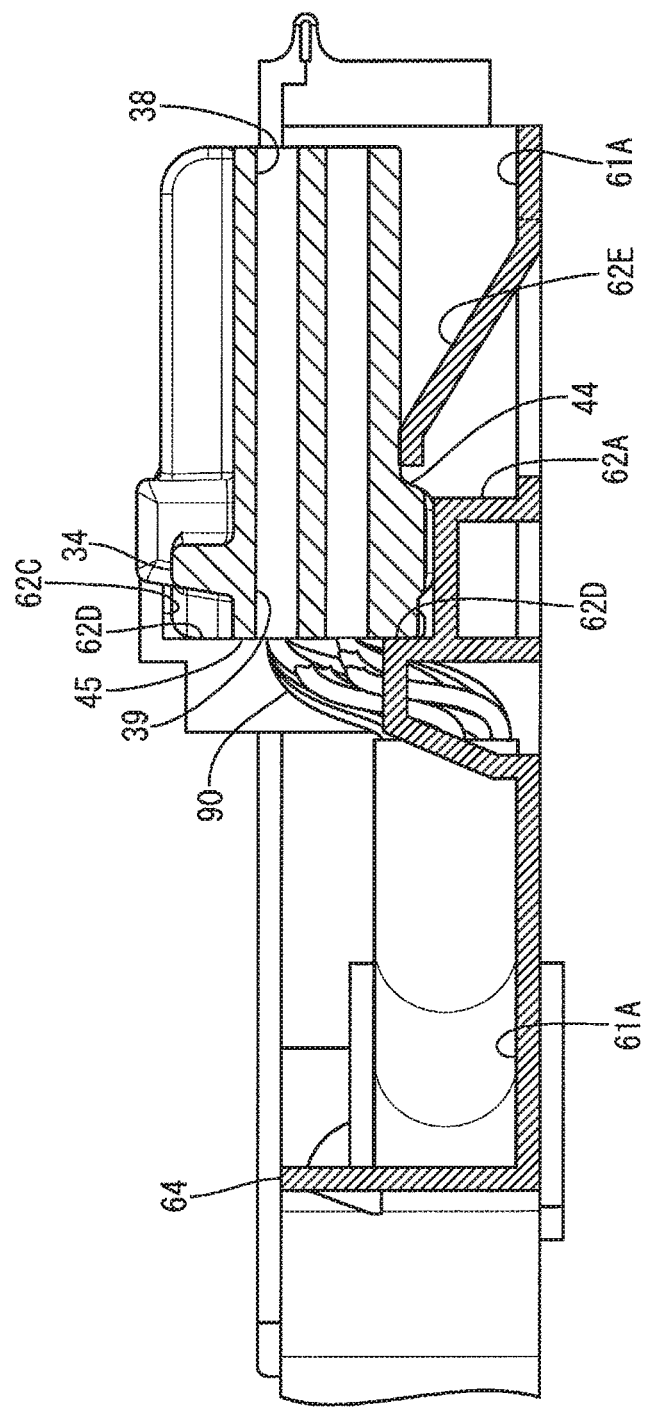
FIG. 10 is a cross-sectional view taken along B-B in FIG. 8.
Figure 11:
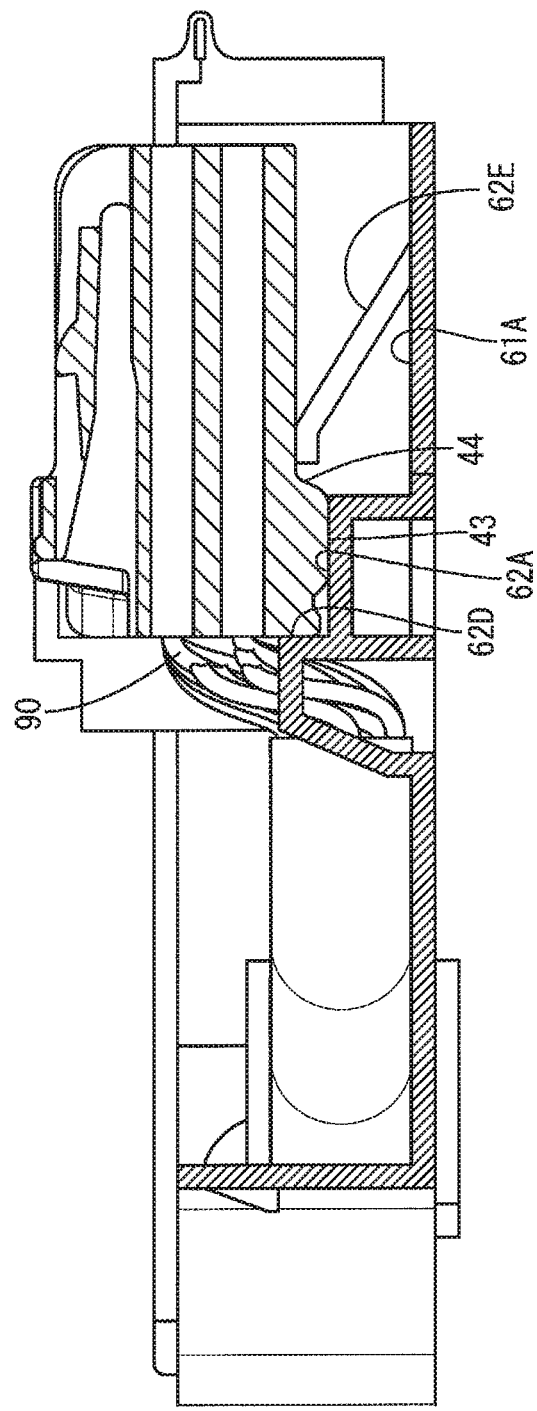
FIG. 11 is a cross-sectional view taken along C-C in FIG. 8.

Also, the back surface side of the rear stopping portion 62D is an inclined surface that extends from the upper end toward the extending surface 61A of the seat portion 61. Accordingly, as shown in FIG. 9, the rear stopping portion 62D is shaped as a hem-widening trapezoid have a vertical front surface side in a cross-section in the front-rear direction.

Note that the support base portion 62 further includes a pair of cantilevered elastic pieces 62E that are arranged in left-right symmetry at a location in front of the bearing portion 62A on the extending surface 61A. The elastic pieces 62E have a base end portion on the front side, extend rearward therefrom while being inclined upward, bend at a position higher than the upper surface of the platform portion, and then extend substantially parallel with the extending surface 61A. The depth of the elastic pieces 62E from the rear end edge (free end) to the front face of the rear stopping portion 62D is set to a depth that enables receiving a lower plate portion 42 of a frame portion 40 of the later-described female connector 30, and is desirably set to the smallest dimension that enables such receiving.

The side wall portion 64 of the connector housing portion 60 is provided rising upward from the plate surface and is continuous from the corner portion of the seat portion 61 that is at the right front corner of the extending surface 61A to the corner portion at the right rear corner of the surplus surface 61B, and the height of the side wall portion 64 is set such that the upper end surface is flush with the upper end surface of the second partition wall 51B of the bus bar support portion 50. The rear end edge portion of the side wall portion 64 is continuous with the right end edge portion of the second partition wall 51B.

The connector cover 65 is integrated with the upper end edge portion of a straight portion of the side wall portion 64 that rises from the extending surface 61A, and is capable of pivoting via a hinge. A recessed portion having a shape that conforms to the upper surface of the female connector 30 is provided on the inner side of the connector cover 65 (the upper surface side in FIG. 3). A pair of front-rear stopping portions 67 are provided on the bottom surface of the recessed portion at locations that are somewhat forward of approximately the center in the front-rear direction and that are in left-right symmetry about the center line of the recessed portion in the left-right direction. The front-rear stopping portions 67 each include a rear stopping piece 67B and a front stopping piece 67A (one example of a front stopping portion) that are shaped as small flat pieces and are arranged side-by-side in the front-rear direction with a gap therebetween that corresponds to the thickness of a rear edge rib 34 of the female connector 30. A reinforcing rib 67C extends from each of the front stopping pieces 67A, passes through the rear stopping piece 67B in the front-rear direction, and reaches the rear end of the recessed portion.

The right end edge portion of the connector cover 65 in the state shown in FIG. 3 extends rightward with a flat plate shape, and then the extending portion therefore extends rearward, forming a front wire cover 66 that covers the front side of the surplus surface 61B. A first projection piece 67D projects from the front end edge portion of the front wire cover 66, and a second projection piece 67E projects upward from the plate surface of the front wire cover 66 while being spaced apart rearward from the first projection piece 67D. The length of the gap between the first projection piece 67D and the second projection piece 67E is set to approximately the thickness of the front wall portion 58A of the surplus surface 61B. Also, a third projection piece 67F projects upward from the outer side (back surface side) of the rear end edge portion of the connector cover 65, and a fourth projection piece 67G projects upward from the inner side (recessed portion side) of the rear end edge portion.

Note that as shown in FIG. 2, the second cover 54B provided on the bus bar support portion 50 has a right-rear corner portion that extends rearward, thus forming a rear wire cover 70 that covers the rear side of the surplus surface 61B. The rear wire cover 70 has a side piece 70A that projects upward from a left end portion in the state shown in FIGS. 1 to 3.

Figure 4:
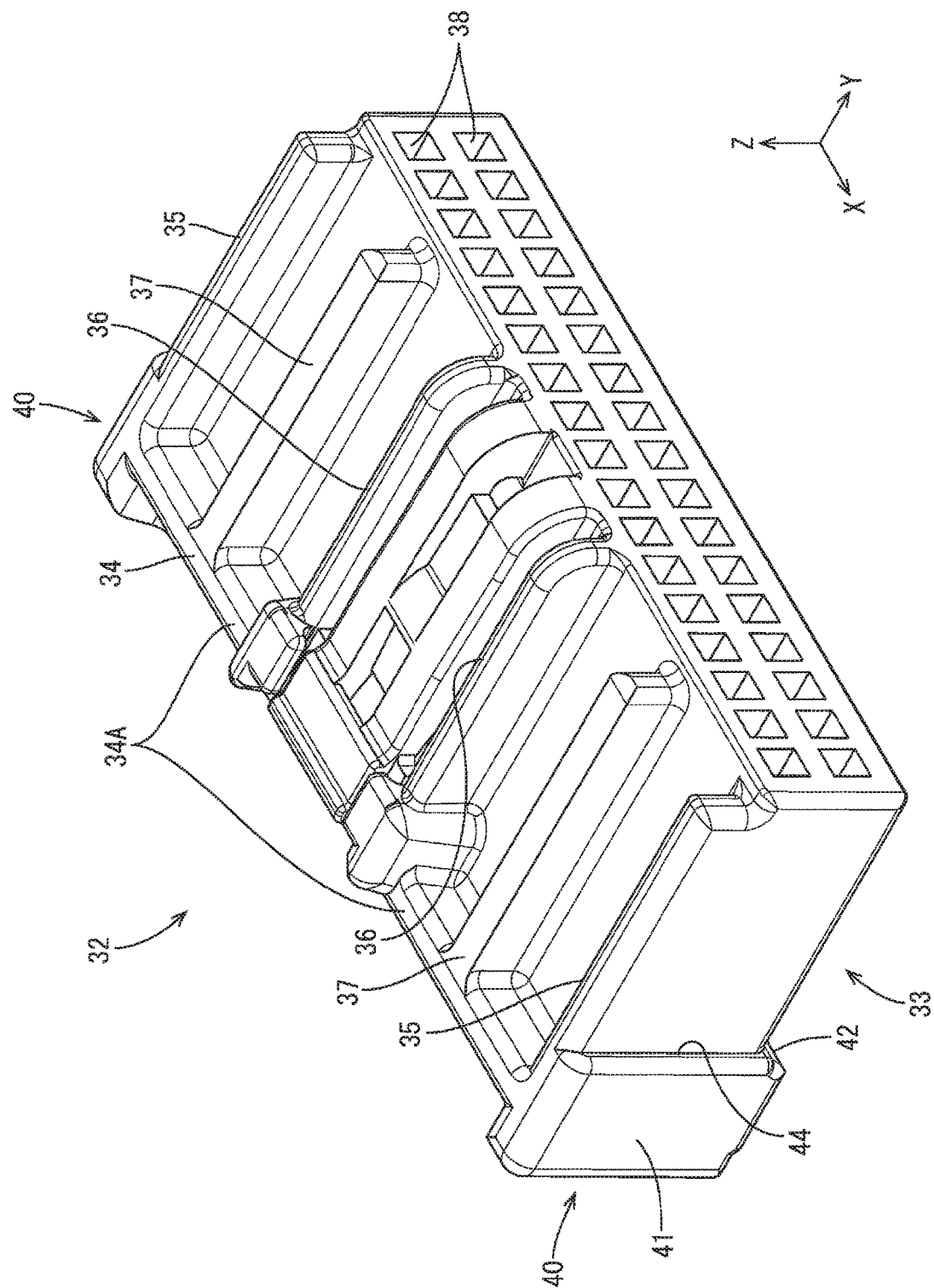
FIG. 4 is a right-front perspective view of a female connector.
Figure 5:
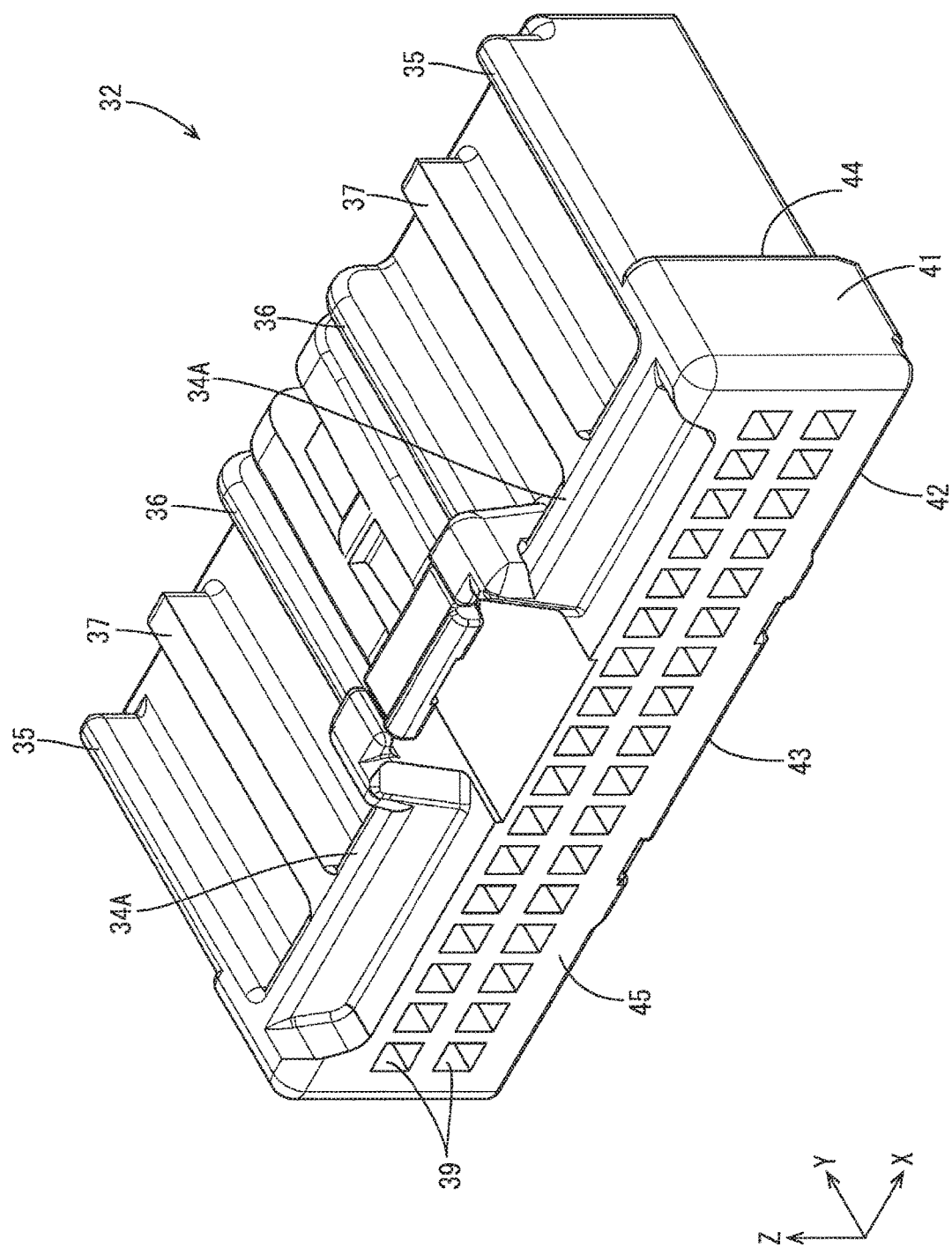
FIG. 5 is a right-rear perspective view of the female connector.
Figure 6:
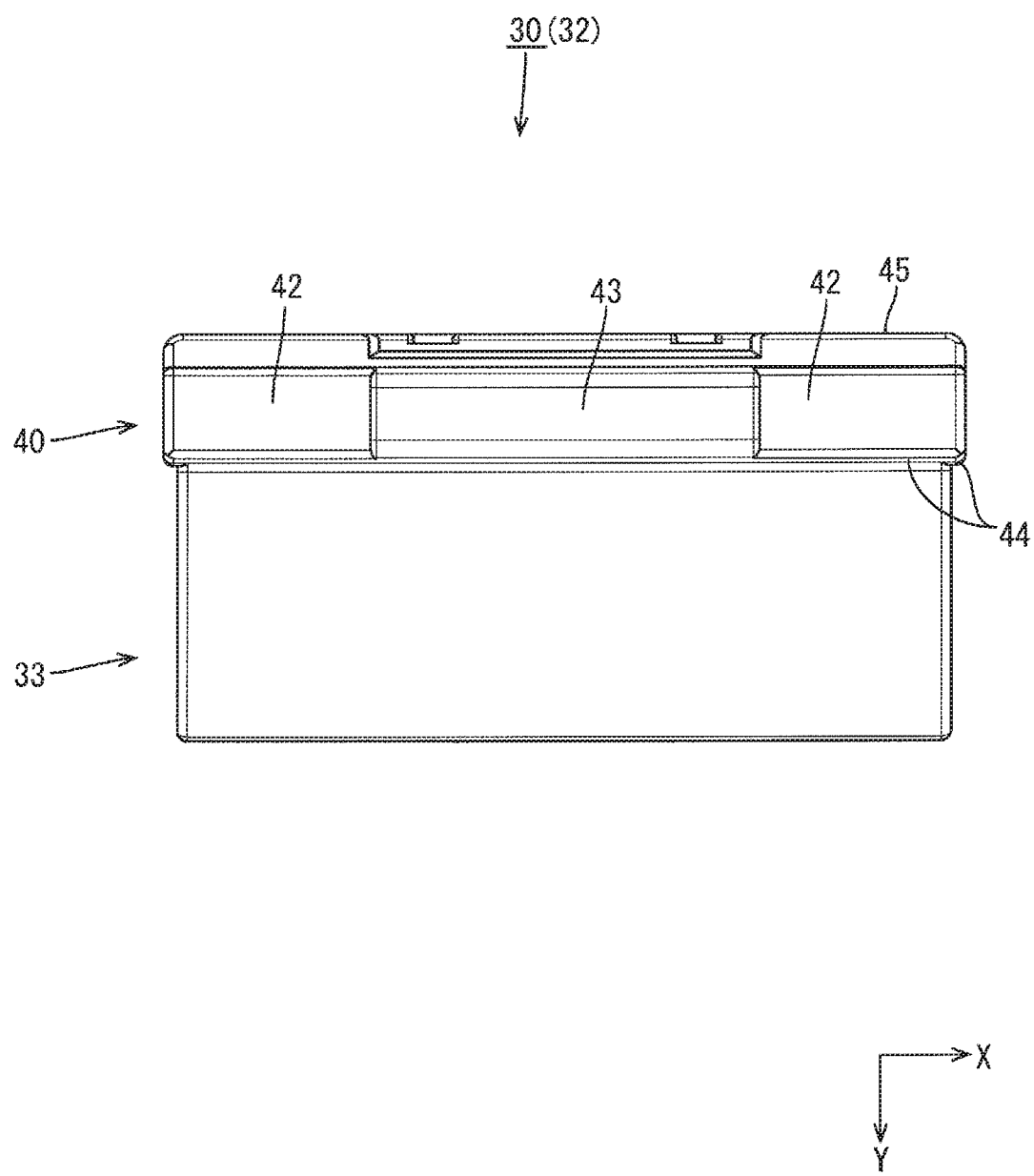
FIG. 6 is a bottom view of the female connector.

The female connector 30 is configured by a housing 32 and female terminals 31 that are housed therein. As shown in FIGS. 4 to 6, the housing 32 includes a connector main body portion 33 that is shaped as a flattened rectangular parallelepiped, and a sharp-cornered "U" shaped frame portion 40 that surrounds the rear end of the connector main body portion 33, and these two portions are integrated with each other.

The frame portion 40 includes side plate portions 41 and a lower plate portion 42. In the frame portion 40, the central portion of the lower plate portion 42 with respect to the left-right direction extends downward with left-right symmetry, thus forming a leg portion 43 for being supported by the bearing portion 62A of the support base portion 62 provided in the connector housing portion 60. A lower surface of the leg portion 43 is a flat surface that is parallel with a lower surface of the connector main body portion 33, and the front end is aligned with the front end of the lower plate portion 42.

The upper surface of the top plate of the housing 32 is provided with a rear edge rib 34 (one example of a rib portion) that extends in the left-right direction along the rear edge, a pair of side edge ribs 35 that extend along the side edge, and a plurality of vertical ribs 36 and 37 that extend in the front-rear direction and are in left-right symmetry between the two side edge ribs 35, and all of these ribs are provided projecting upward. Portions of the rear edge rib 34 that extend between left and right first ribs 36 that are closest to the center line in the left-right direction of the top plate and left and right second ribs 37 adjacent thereto are sandwiched portions 34A for being sandwiched by the front-rear stopping portions 67 of the connector cover 65. The rear edge rib 34, the two second ribs 37, and the two side edge ribs 35 are continuous with each other, and the upper end surfaces thereof are flush with each other. A lock receiving portion for being locked by a locking portion of the partner connector M is arranged between the two first ribs 36.

The housing 32 is provided with a plurality of terminal holes 38 that are open in the forward direction (i.e., a direction orthogonal to the arrangement direction of the power storage elements BC), and the female terminals 31 are respectively housed in the terminal holes 38. In other words, a forward portion of the housing 32 (the portion not surrounded by the frame portion 40) forms a portion that is to be fitted into a hood portion provided in the partner connector M (hereinafter, called the partner connector M), and a rearward portion (frame portion 40) forms a portion that is not fitted into the hood portion of the partner connector M.

A plurality of introduction holes 39 for introducing the detection wires 90 are provided side-by-side in a back surface 45 of the main body portion of the housing 32. In other words, in the back surface 45 of the housing 32, at least the back surface 45 of the frame portion 40 is a region that is outside the region provided with the insertion holes. Also, the back surface 45 of the frame portion 40 includes a surface that is flush with the back surface 45 of the main body portion.

In order to house the female connector 30 in the connector housing portion 60, the back surface 45 of the female connector 30 is directed toward the rearward side of the connector housing portion 60 and pushed rearward therein while elastically displacing the free end sides of the elastic pieces 62E downward with the lower surface of the frame portion 40. When the frame portion 40 of the connector passes over the elastic pieces 62E and is arranged in the space defined by the two lateral stopping portions 62B, the two upper stopping portions 62C, and the bearing portion 62A of the support base portion 62, the free end sides of the elastic pieces 62E undergo upward elastic deformation so as to rise upward in front of a step surface 44 in the lower surface of the frame portion 40 (front surface of the portion that is not fitted into the hood portion of the partner connector M), and can abut against it. Accordingly, as shown in FIGS. 7 to 11, the female connector 30 is restricted from moving in the left-right, upward, and rearward directions by the lateral stopping portions 62B, the upper stopping portions 62C, and the rear stopping portions 62D, while the frame portion 40 (the portion not fitted into the hood portion of the partner connector M) is supported by the bearing portion 62A of the support base portion 62, and also forward movement is restricted by the elastic pieces 62E at the step surface 44 of the lower surface of the frame portion 40 (the portion that is to be covered by the hood portion of the partner connector M). Also, in this state, in the female connector 30, the terminal holes 38 face forward (i.e., direction perpendicular to the arrangement direction of the power storage elements BC), and the forward portion of the connector (the portion that is to be fitted into the hood portion of the partner connector M) is held in a state of floating above the insulating protector 20 (extending surface 61A) by the sum of the vertical thickness of the bearing portion 62A (the difference between the heights of the upper surface of the bearing portion 62A and the extending surface 61A) and the projecting thickness of the lower surface of the leg portion 43 of the frame portion 40 of the connector from the connector main body portion 33.

Figure 7:
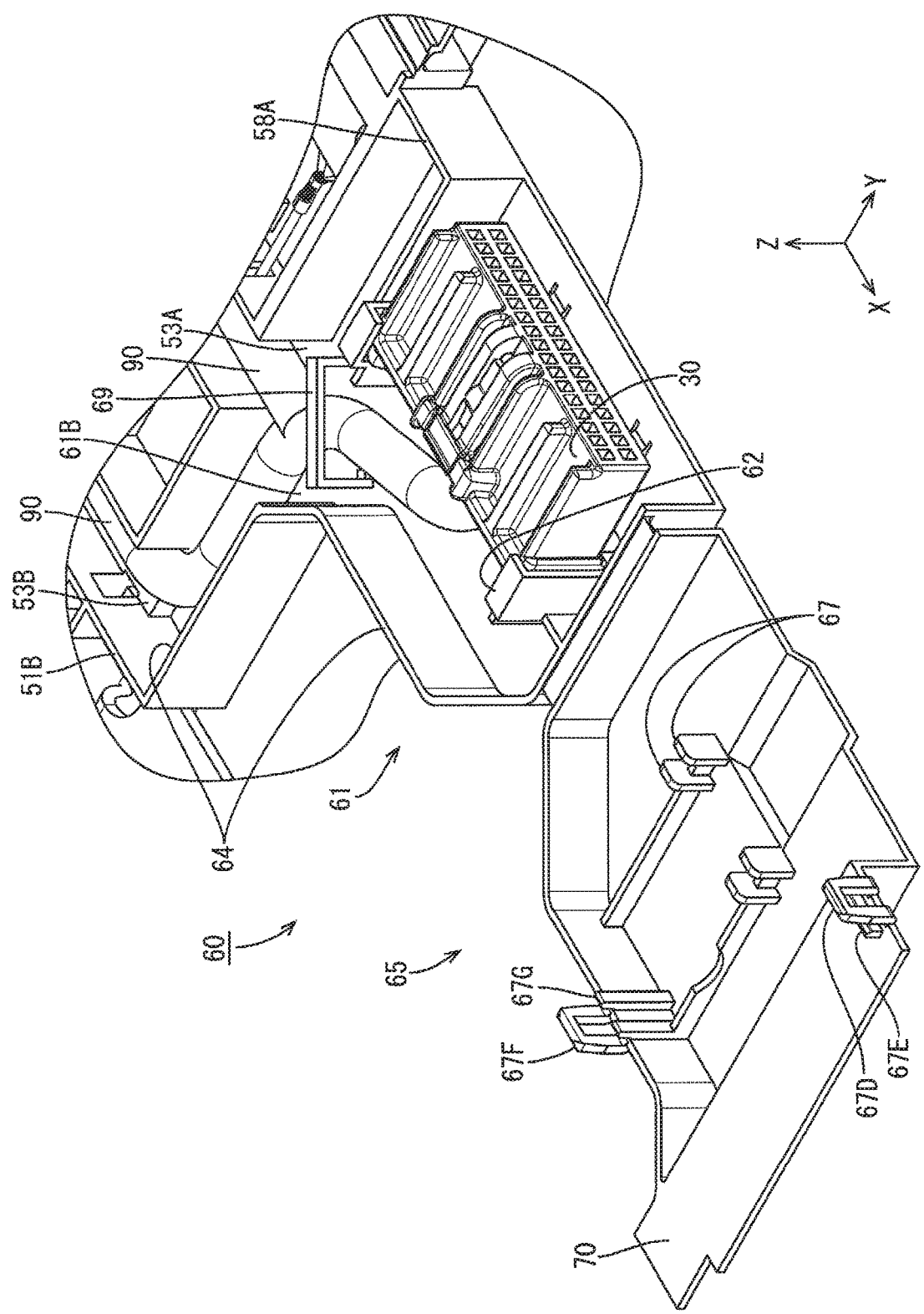
FIG. 7 is a perspective view of the connector housing portion in which the female connector is arranged.
Figure 8:
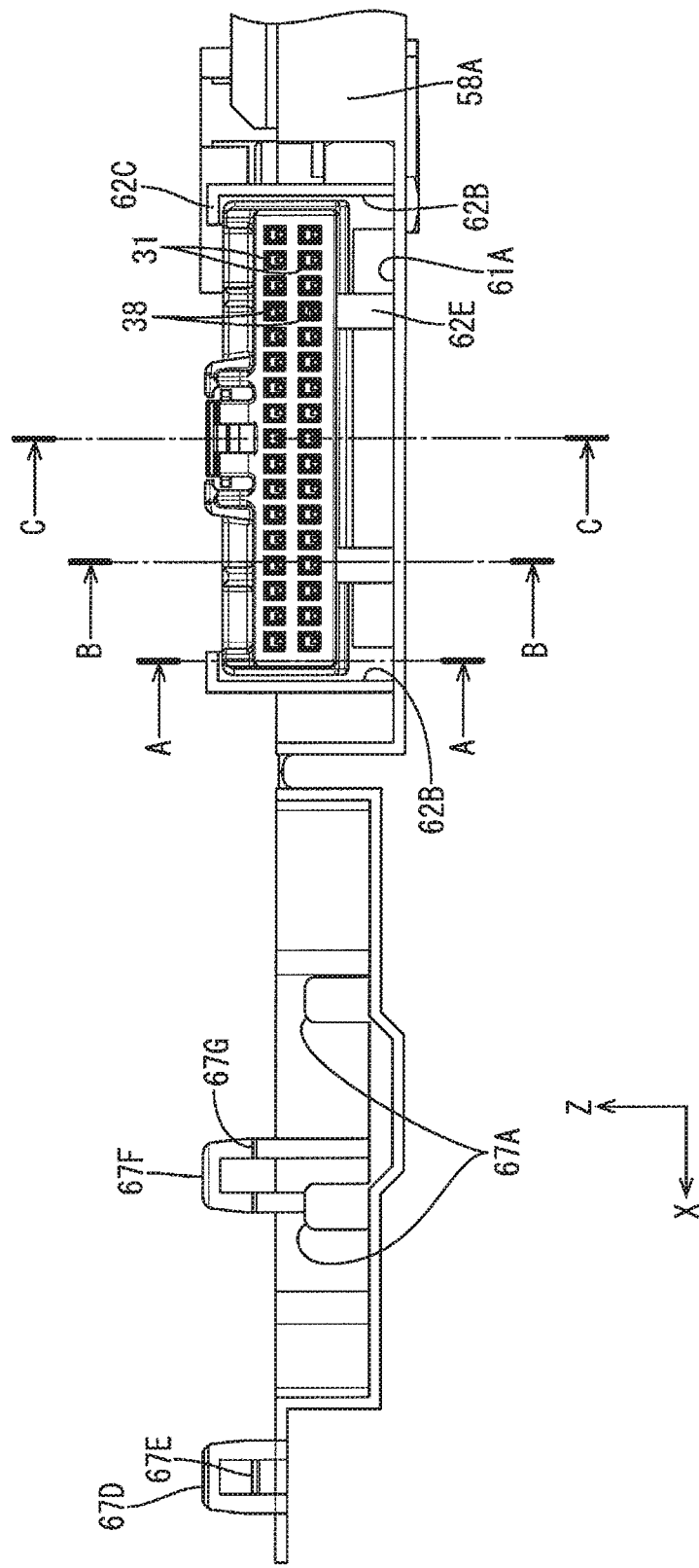
FIG. 8 is a front elevation view of the connector housing portion in which the female connector is arranged.

As shown in FIG. 7, the detection wires 90, which extend from the second wire mounting surface 53B and enter the connector housing portion 60, bend forward at an approximately right angle over the surplus surface 61B, extend to an extension line of the first wire mounting surface 53A, and merge with the detection wires 90 that extend from the first wire mounting surface 53A and enter the connector housing portion 60. The merged detection wires 90 bend gently diagonally forward and rightward, are fixed to the seat portion 61 by being inserted into the insertion hole of the seat portion 61 and then covered with the fixing member 69, and then bend gently forward at the rear side of the female connector 30. Note that although the example of a sharp-cornered "U" shaped fixing member 69 is shown in the present embodiment, the fixing member 69 may be a cable tie, or in other words, it is sufficient to be able to fix the detection wires 90 inside the connector housing portion 60.

Figure 12:
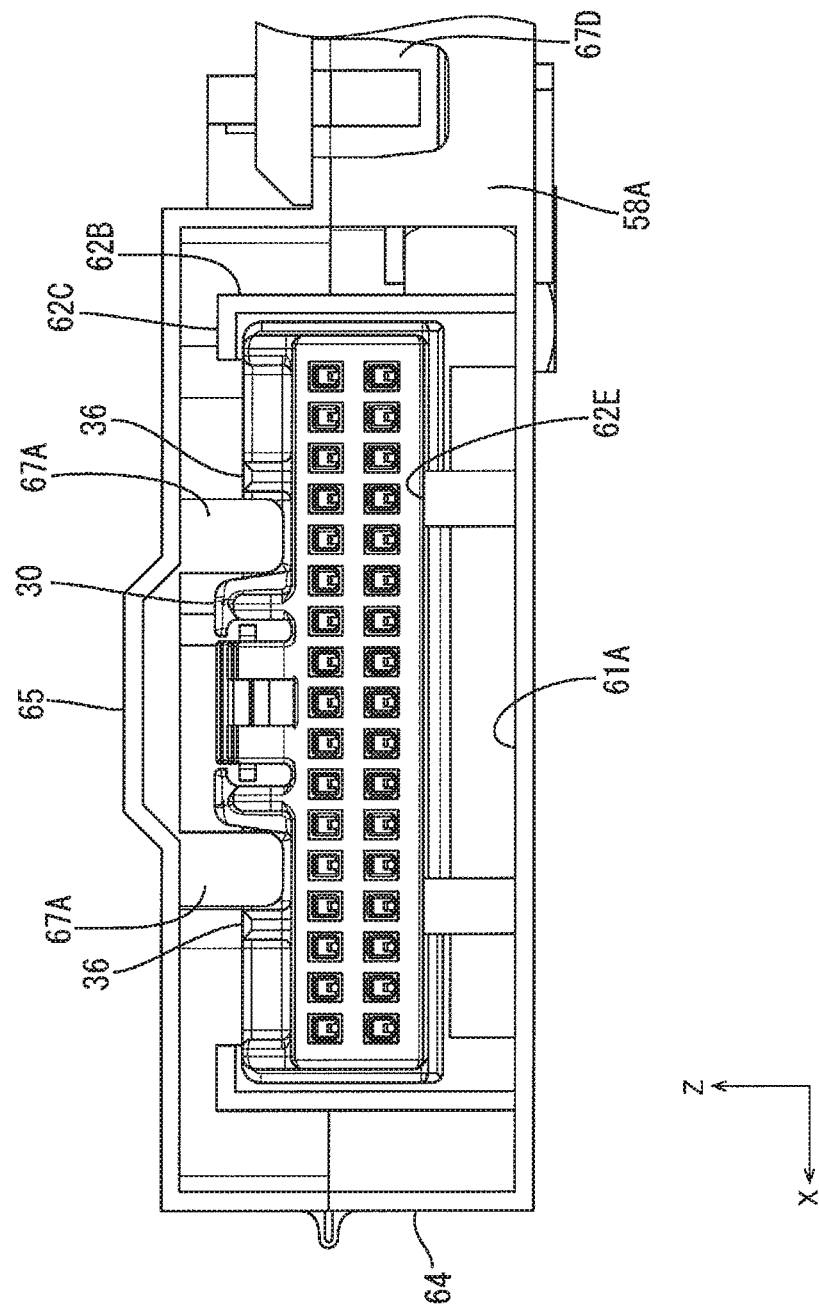
FIG. 12 is a front view of a state where the female connector has been arranged and a cover has been closed.

When the connector cover 65 is placed over the upper surface of the female connector 30 housed in the connector housing portion 60, the female connector 30 and the detection wires 90 on the extending surface 61A are covered by the connector cover 65, and the forward portion of the detection wires 90 arranged on the surplus surface 61B is covered by the front wire cover 66. At this time, as shown in FIG. 12, the front stopping pieces 67A and the rear stopping pieces 67B of the front-rear stopping portions 67 provided in the recessed portion of the connector cover 65 sandwich the sandwiched portions 34A provided on the top surface of the connector, and the first projection piece 67D and the second projection piece 67E provided in the front wire cover 66 sandwich the upper end edge portion of the front wall portion 58A of the surplus surface 61B, and the third projection piece 67F and the fourth projection piece 67G sandwich the upper end edge portion of the side wall portion 64 that rises from the rear end edge of the extending surface 61A of the seat portion 61. Accordingly, the connector cover 65 is supported by the front wall portion 58A of the surplus surface 61B and the side wall portion 64 of the seat portion 61, displacement in the front-rear direction is restricted, and the connector is restricted from moving in the front-rear direction by the front-rear stopping portions 67 of the connector cover 65.

Note that when the second cover 54B is placed over the bus bar support portion 50, the rearward portion of the detection wires 90 arranged on the surplus surface 61B is covered by the rear wire cover 70 that is integrated with the second cover 54B. At this time, due to causing the partition joining portion 55 to span the side piece 70A of the rear wire cover 70, the rear wire cover 70 is supported by the partition joining portion 55.

Figure 13:
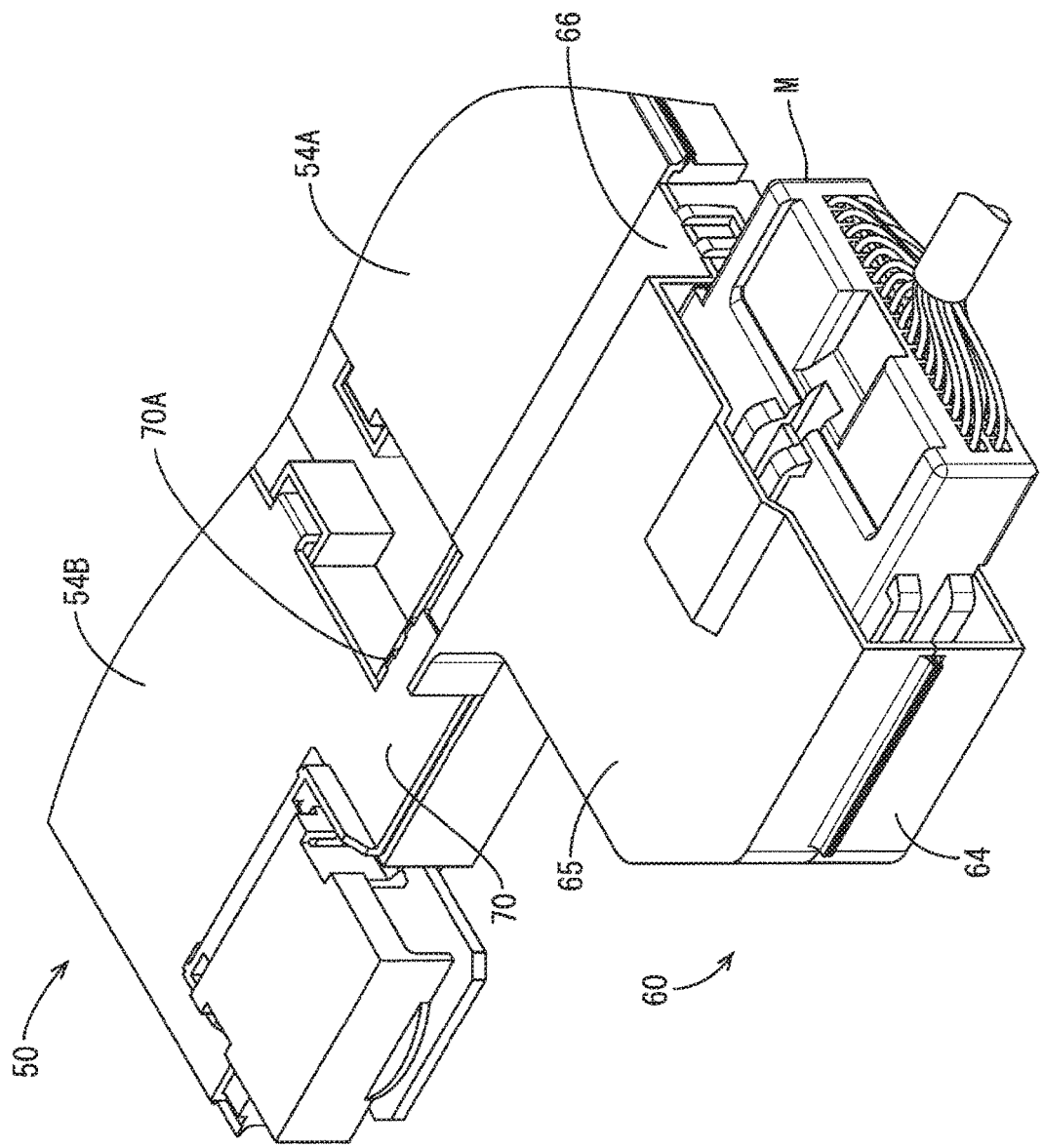
FIG. 13 is a perspective view of a state where a partner connector has been mated.
Figure 14:
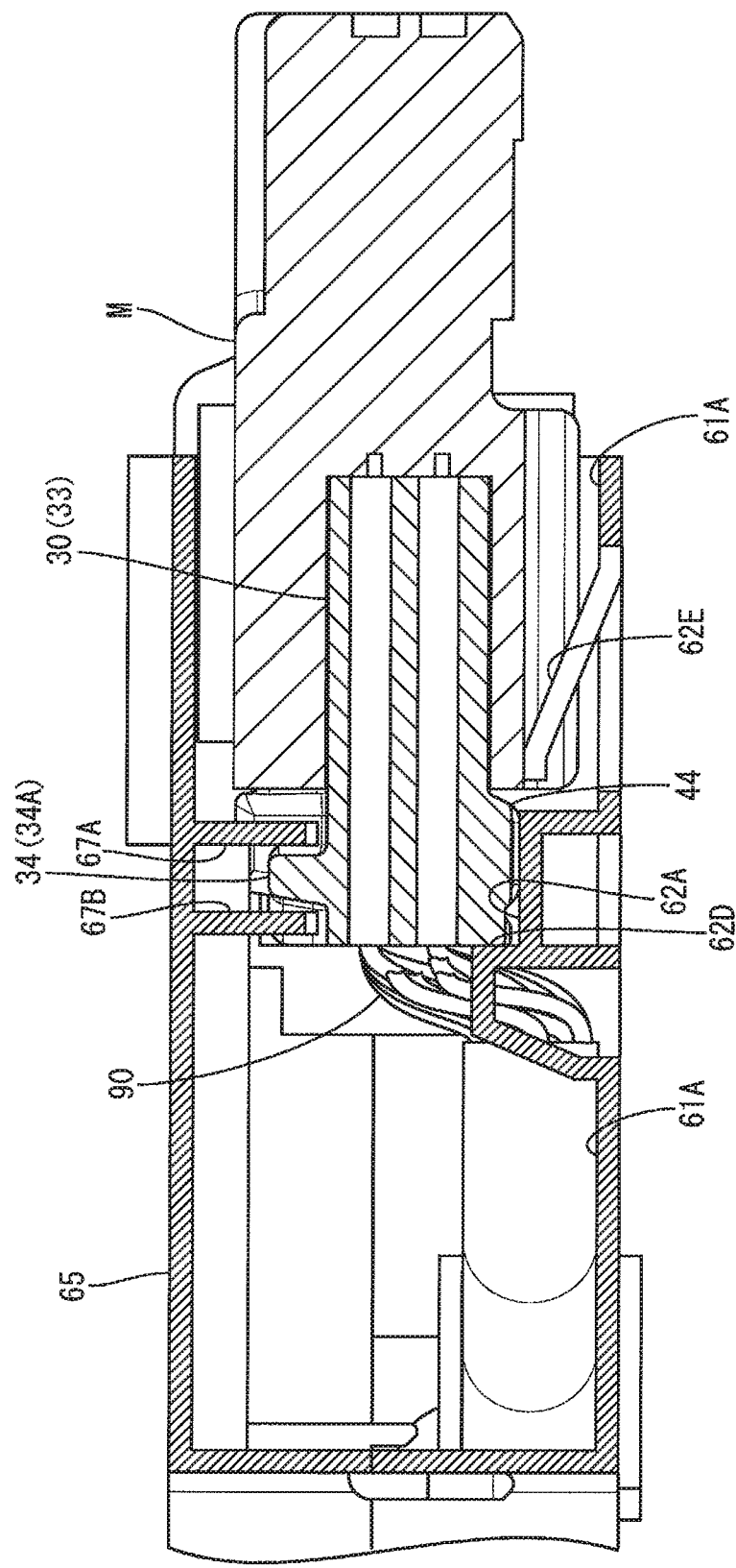
FIG. 14 is a cross-sectional view of the state where the partner connector has been mated.
Figure 15:
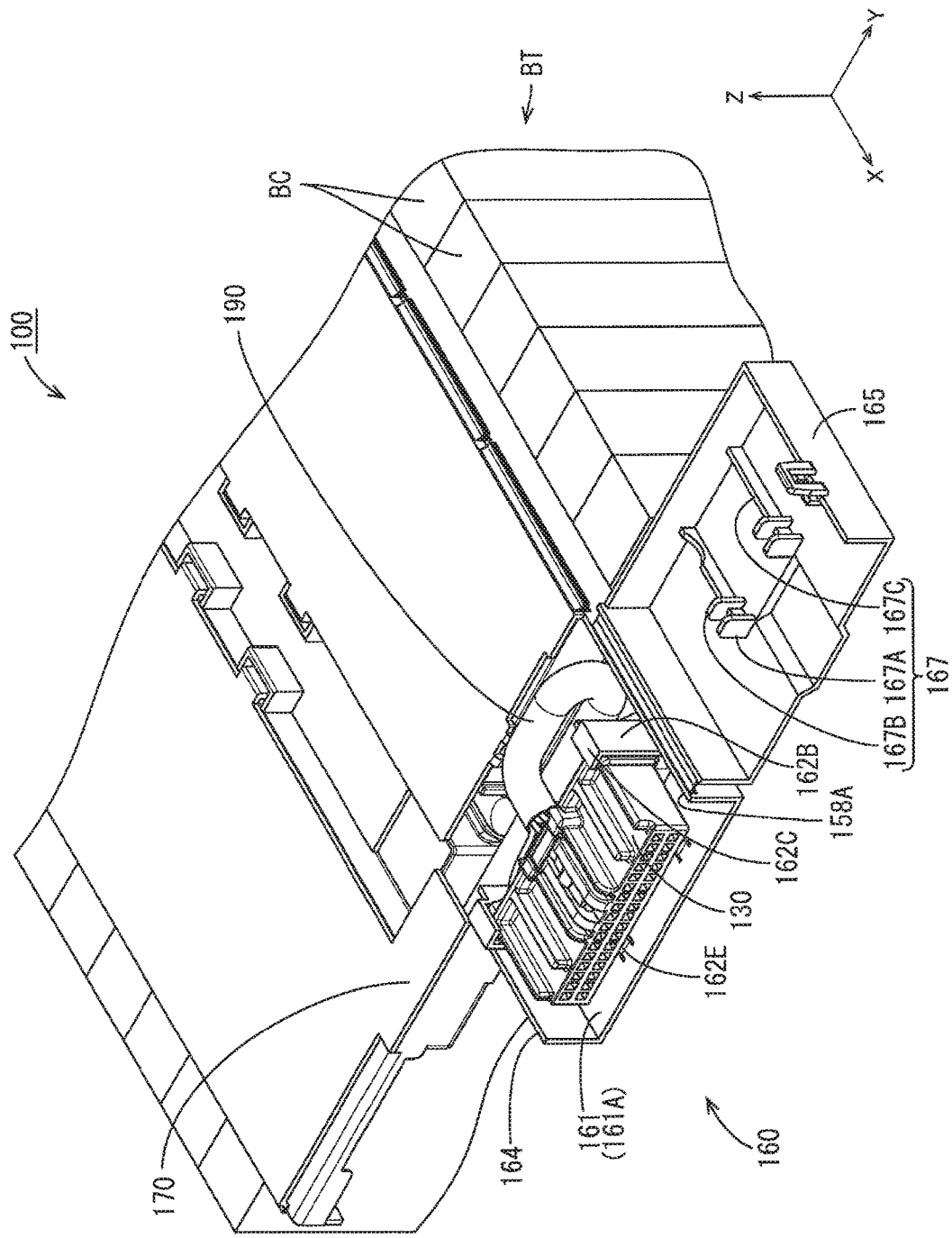
FIG. 15 is a right-front perspective view of a state where a female connector has been arranged in a wiring module according to a second embodiment.

When the partner connector M is to be mated with the connector housed in the connector housing portion 60, the hood portion of the partner connector M is fitted around the forward portion of the female connector 30 and then pushed rearward. The elastic pieces 62E that protrude into the entrance route are elastically displaced downward due to being pressed by the lower surface of the hood portion, and abut against the lower surface of the hood portion. The partner connector M then locks with a locking portion provided on the top surface of the female connector 30, thus achieving a mated state as shown in FIGS. 13 and 14. At this time, the step surface 44 of the frame portion 40 of the female connector 30 opposes the open face of the partner connector M, and the elastic pieces 62E are in a state of being retracted downward out of the mating path of the partner connector M.

According to the configuration of the present embodiment, the forward portion of the female connector 30 that is to be fitted into the partner connector M is held in a floating state, and it is possible to restrict displacement of the female connector 30 while also supporting the portion that is not to be mated with the partner connector M. Also, when the partner connector M is to be mated to the female connector 30, the rear stopping portion 62D of the support base portion 62 abuts against the region of the back surface 45 of the female connector 30 that is approximately sharp-cornered "U" shaped and surrounds the detection wire 90 introduction region, and absorbs the mating force, thus making it possible to prevent force from being applied to the detection wires 90, and also absorb force evenly in the left-right direction.

Also, it is possible to restrict forward displacement of the female connector 30 with the elastic pieces 62E when not mated with the partner connector M, and the front-rear stopping portions 67 provided in the cover are not necessarily required. Accordingly, in the case of attaching the wiring module 1 to the power storage module BT while the cover is open for example, the state of the detection wires 90 can be checked even during such an operation, and there is no need to close the connector cover 65 simply to prevent forward shifting of the female connector when tilting the wiring module 1, thus achieving favorable workability. Also, after the partner connector M has been fitted around the female connector 30. (i.e., when forward displacement is no longer prevented by the elastic pieces 62E), if the connector cover 65 is closed, forward shifting of the connector is subsequently prevented by the front stopping pieces 67A provided in the connector cover 65.

Also, according to the present embodiment, the rear stopping portion 62D of the support base portion 62 abuts against, and absorbs external force from, the left and right end portions and lower end portion of the back surface 45 of the female connector 30, and after the connector cover 65 is closed, the front-rear stopping portions 67 provided in the connector cover 65 come into contact with, from the rear, the back surfaces 45 of the ribs provided on the upper surface of the female connector 30 and absorb external force therefrom, thus making it possible to more reliably restrict rearward movement.

Also, the support base portion 62 is arranged so as to be separated from the bus bar support portion 50 by the surplus surface 61B, thus making it possible to provide a commensurate allowance for the extending length of the detection wires 90 in the connector housing portion 60. Accordingly, the bending locations of the detection wires 90 can be distributed, the female connector 30 can be handled more easily, and workability is made favorable, and moreover, impact received from the outside via the connector can be further absorbed by play of the detection wires 90.

Second Embodiment

A second embodiment of technology disclosed in the present specification will be described below with reference to FIGS. 15 to 19.

Whereas the wiring module 1 of the first embodiment has a configuration in which the female connector 30 is fixed to the insulating protector 20 with the terminal holes 38 facing forward (i.e., a direction orthogonal to the arrangement direction of the power storage elements BC), a wiring module 100 of the present embodiment has a configuration in which a female connector 130 is fixed to a insulating protector 120 with terminal holes 138 facing rightward (i.e., along the arrangement direction of the power storage elements BC). Note that only configurations different from the above embodiment will be described in the present embodiment, and descriptions will not be given for configurations that are similar to the first embodiment.

In the present embodiment, in a support base portion 162, a front wall portion 158A of the bus bar support portion 150 is provided such that the front wall portion 158A is continuous with the front end edge portion of a seat portion 161, and the right end edge is a free end not provided with the side wall portion 164. Also, in the support base portion 162 that has a configuration similar to the first embodiment, the lower edge portion of an inclined surface provided in a back surface 145 of the rear stopping portion extends along the right end of a surplus surface 161B, and is arranged in left-right symmetry about a center line in the front-rear direction of the extension portion of the seat portion 161.

A connector cover 165 is integrated with the upper end edge portion of the front wall portion 158A of the seat portion 161, and is capable of pivoting via a hinge. The connector cover 165 includes a recessed portion that is open rightward, and front-rear stopping portions 167 and reinforcing ribs 167C are provided in an approximately central portion of the bottom surface of the recessed portion and are in left-right symmetry about a center line in the front-rear direction, thus restricting displacement of the connector in the left-right direction (the front-rear direction in the mating direction). Also, a ring-shaped piece provided with a through-hole in the front-rear direction is provided in the edge portion of the connector cover 165 on the side opposite to the hinge in the state shown in FIG. 15, and a projection portion is provided at a position corresponding to the ring-shaped piece on the side wall portion 164 that rises from the rear end edge of the extending surface 161A. Note that the front wire cover is not provided in the present embodiment, and the recessed portion of the connector cover 165 is configured to cover both the female connector 130 and the detection wires 190 on the front side of the connector.

When the connector cover 165 is placed over the female connector 130, the projection portion is fitted into the through-hole 113 of the ring-shaped piece, thus restricting movement in the left-right direction (the front-rear direction in the connector mating direction) of the connector cover 165.

Figure 16:
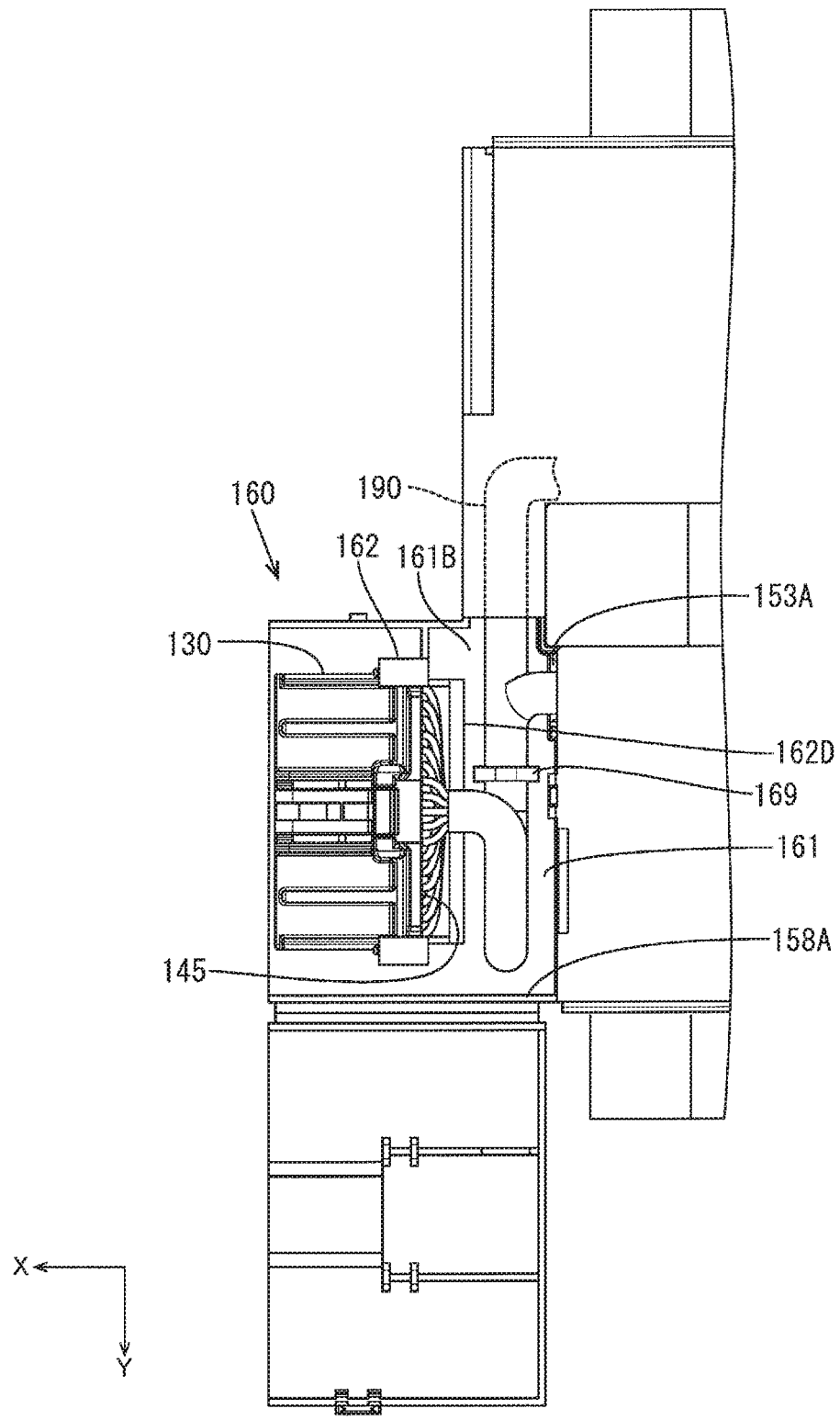
FIG. 16 is a right-front perspective view of a state where the female connector has been arranged and a cover has been closed.
Figure 17:
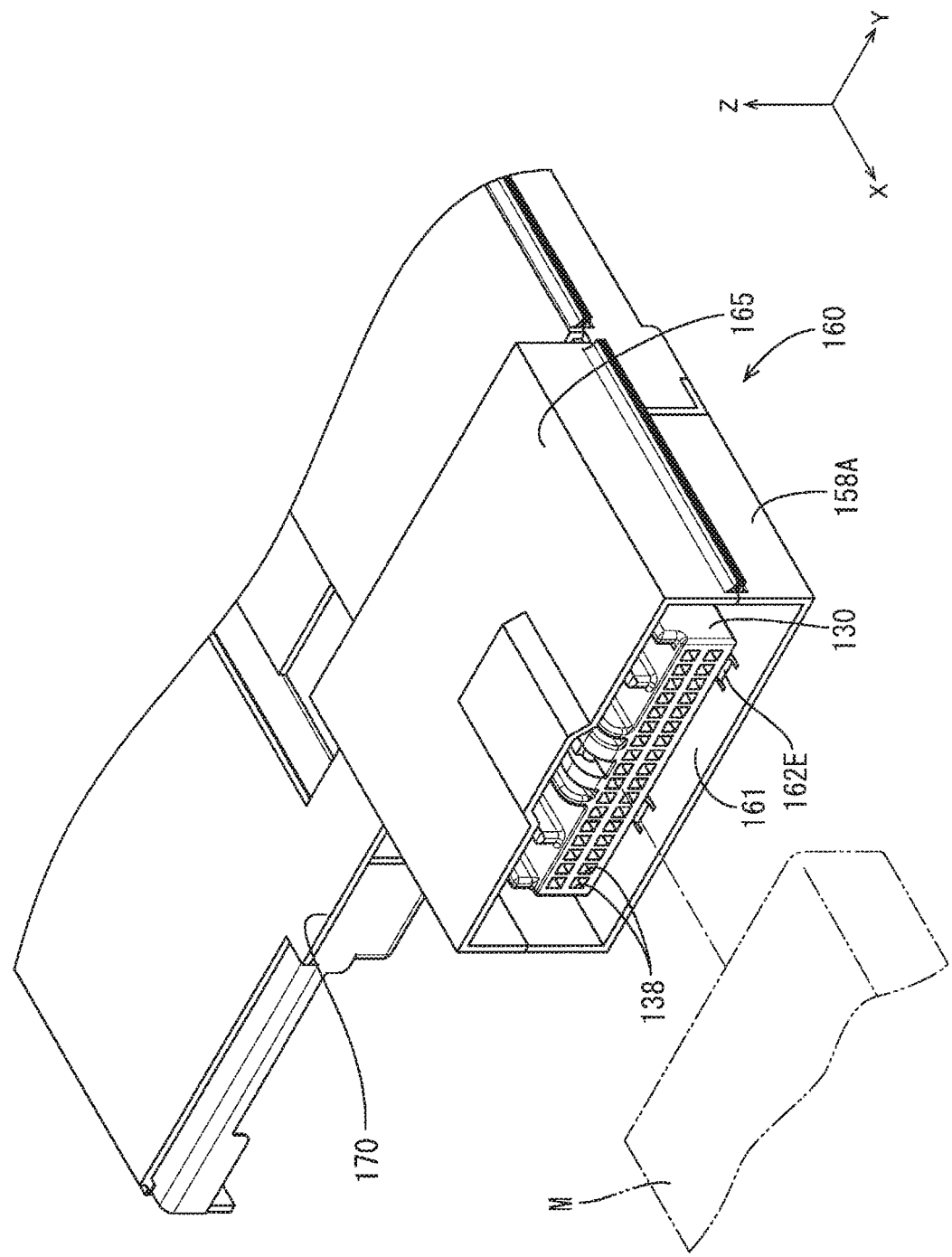
FIG. 17 is a top view of a state where a partner connector has been mated.
Figure 18:
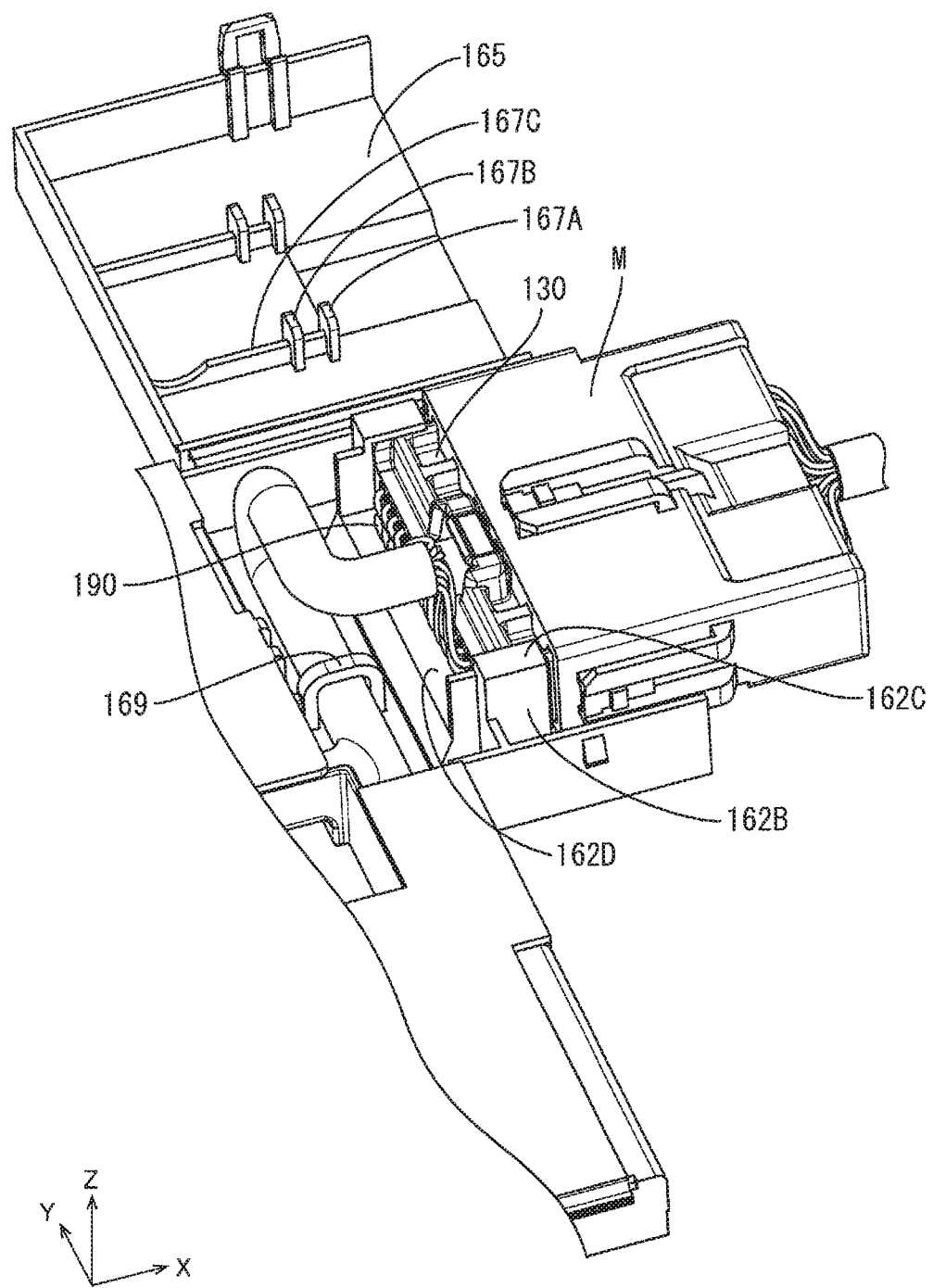
FIG. 18 is a left-rear perspective view of the state where the partner connector has been mated.
Figure 19:
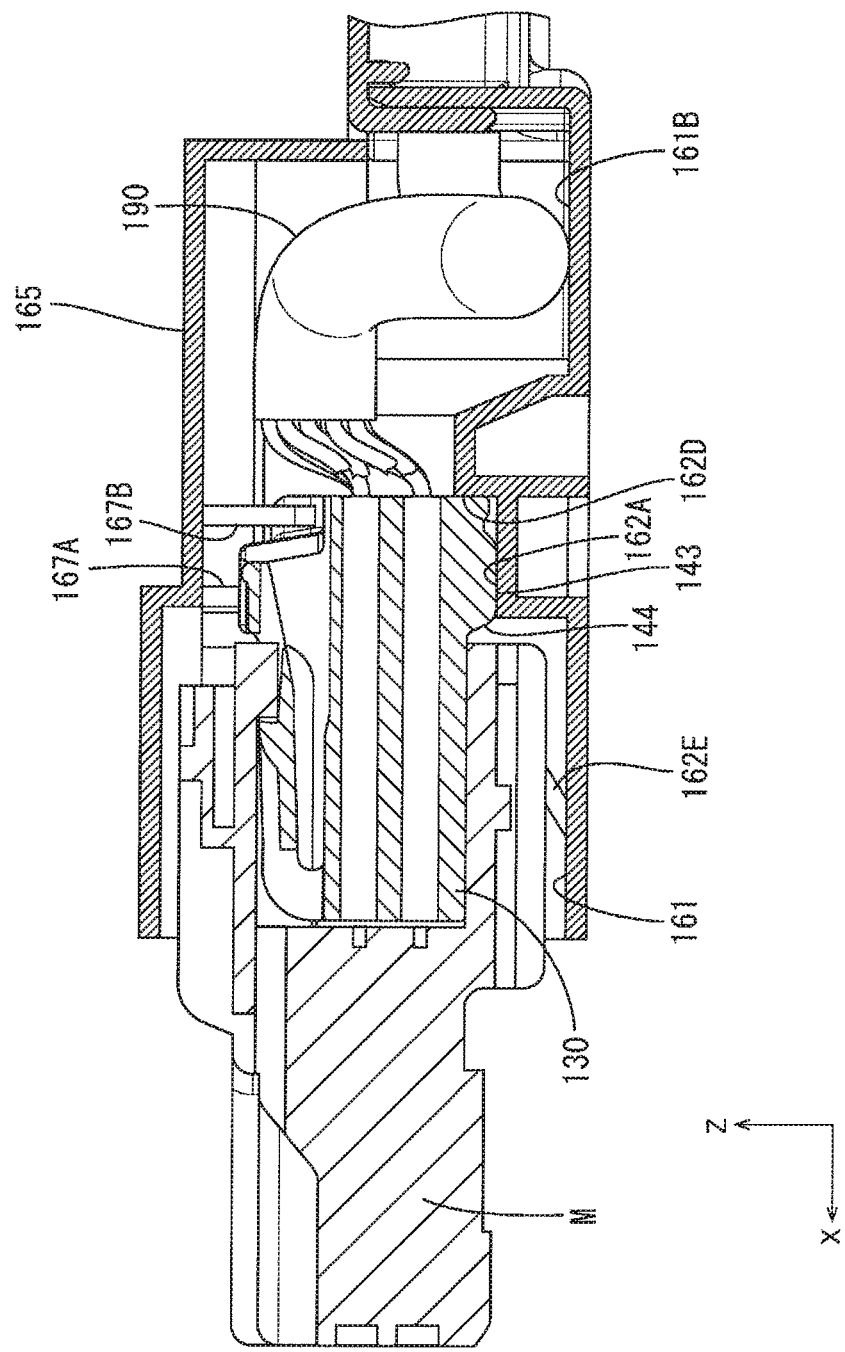
FIG. 19 is a partial cutout front elevation view of a state where a partner connector has been mated and a cover has been closed.

As shown by the dashed lines in FIG. 16, the detection wires 190, which extend from the second wire mounting surface 153B and enter the connector housing portion 160, bend forward at an approximately right angle on the surplus surface 161B, extend to an extension line of the first wire mounting surface 153A, and merge with detection wires 190 that extend from the first wire mounting surface 153A into the connector housing portion 160 and then bend forward at a right angle. The merged detection wires 190 extend forward, are fixed to the seat portion 161 by being inserted into the insertion hole of the seat portion 161 and then covered with the fixing member 169, then extend further forward, and are then bent back 180 degrees in front of the front wall portion 158A of the seat portion 161. The bent-back bundle of detection wires 190 is stacked on the unbent portion of detection wires 190, then extends rearward, and is then bent at a right angle rearward of the female connector 130 (back surface side). As shown in FIGS. 17 and 18, the partner connector M is then fitted around the female connector 130 from the rightward side (arrangement direction of the power storage element BC), thus achieving mating with the partner connector M.

According to the present embodiment, the support base portion 162 is arranged at a location toward the right end of the surplus surface 161B, thus ensuring a minimum required amount of space corresponding to the width of the bundle of detection wires 190 that extend in the connector housing portion 160, and also minimizing the length of the connector housing portion 160 in the arrangement direction of the power storage elements BC.

Also, in the case where the support base portion 162 is arranged at a location toward the right end of the surplus surface 161B as in the present embodiment, the distance from the right end portion of the first wire mounting surface 153A to the connector back surface 145 in particular is short, but according to the present embodiment, the front-rear length and vertical depth of the space on the surplus surface 161B is effectively used to allow the detection wires 190 to be bent back and stacked on themselves, thus making it possible to ensure a sufficient length for the detection wires 190. Accordingly, the bending locations of the detection wires 190 can be distributed, the female connector 130 can be handled more easily, and workability is made favorable, and moreover, impact received from the outside via the connector can be further absorbed by play of the detection wires 190.

Other Embodiments

The technology disclosed in the present specification is not limited to the embodiments described by way of the above descriptions and the drawings, and aspects such as the following can also be carried out, for example.

(1) Although the detection wires 90 each have one end portion that is connected to a bus bar terminal 10 and detects the voltage of a cell in the configurations of the embodiments described above, instead of this or in addition, the detection wires 90 may be an electrical wire that is connected to a temperature sensor that detects the temperature of a power element such as a cell, or in other words need only be an electrical wire for detecting the state of a power element such as a cell.

(2) In the configurations of the embodiments described above, due to the female connector 30 being placed on the bearing portion 62A, the portion that is to be fitted into the partner connector M in the insulating protector 20 is held in a floating state, but if there is no need to be held in a floating state, it is possible to omit the bearing portion 62A and directly place the connector housed in the insulating protector on the seat portion 61.

(3) Also, the elastic pieces 62E are not limited to be integrally molded with the insulating protector 20, may be configured as independent components, need only be provided if there is a need to prevent forward shifting when the connector is not mated with the partner connector M, and are not necessarily essential.

LIST OF REFERENCE NUMERALS 1, 100 Wiring module
10 Bus bar terminal
90 Detection wire
20 Insulating protector
30, 130 Female connector
32 Housing
33 Connector main body portion
34 Rear edge rib (rib portion)
40 Frame portion
50 Bus bar support portion
60, 160 Connector housing portion
61, 161 Seat portion
61A, 161A Extending surface
61B Surplus surface
62 Support base portion (support base portion, movement restricting means)
62A Bearing portion
62B Lateral stopping portion
62C Upper stopping portion
62D Rear stopping portion
62E Elastic piece
65, 165 Connector cover
66 Front wire cover
67A, 167A Front stopping piece (front stopping portion)
70, 170 Rear wire cover
M Partner connector

The invention claimed is:

1. A wiring module configured for attachment to a power module in which a plurality of power elements that store or generate electrical power are arranged side-by-side, the wiring module comprising:
an insulating protector that houses a plurality of interconnection conductors for interconnecting the power elements;
a plurality of detection wires that are housed in the insulating protector, extend from a side corresponding to the power elements, and detect a state of the power elements;
a connector that is provided at an end portion of the detection wires and is arranged inside the insulating protector; and
a movement restrictor that is provided in the insulating protector and restricts movement of the connector by locking the connector,
the movement restrictor including a pair of spaced apart lateral stopping portions and a rear stopping portion spanning a distance between and connected to the lateral stopping portions so as to at least partly define a receiving space, wherein a back surface portion of the connector is positioned within the receiving space.

2. The wiring module according to claim 1,
wherein the connector is a female connector that includes a housing having a forward portion configured to be fitted into a hood portion provided in a partner connector, and the movement restrictor provided on the insulating protector and having a support base portion that supports a rearward portion of the housing that is not to be fitted into the hood portion and holds the forward portion in a condition spaced above the insulating protector.

3. The wiring module according to claim 2,
wherein the rear stopping portion is integrated with the support base portion, the rear stopping portion restricting rearward movement of the housing by locking a region of the back surface portion of the female connector that is outside a region in which the detection wires are introduced.

4. The wiring module according to claim 2,
wherein the pair of lateral stopping portions are integrated with the support base portion, the pair of lateral stopping portions restricting lateral movement of the female connector by coming into contact with a side wall of the housing of the female connector.

5. The wiring module according to claim 4,
wherein the movement restrictor includes an upper stopping portion integrated with each of the pair of lateral stopping portions, the upper stopping portions restricting upward movement of the female connector by coming into contact with a top plate of the housing of the female connector.

6. The wiring module according to claim 2,
wherein the movement restrictor includes a cantilevered elastic piece having a free end on a rear side of the female connector, the elastic piece being provided in correspondence with a portion of the insulating protector in which the housing of the female connector is in the condition spaced above the insulating protector, and in a condition in which the female connector is not mated with the partner connector, the elastic piece restricts forward movement of the female connector by locking of the free end to the housing of the female connector, and when the partner connector is mated with the female connector, the elastic piece is pressed by the hood portion of the partner connector so as to become elastically displaced to a position outside of a mating path of the hood portion.

7. The wiring module according to claim 2,
wherein the insulating protector is provided with a cover portion that covers the female connector and the partner connector in a condition in which the two connectors are mated, and the housing of the female connector is provided with a rib portion that projects from a portion that is not to be fitted into the hood portion, and the movement restrictor includes a front stopping portion provided in the cover portion, the front stopping portion coming into contact with a front face of the rib portion when the cover portion covers the two mated connectors.

* * * * *